United States Patent
Kaczmarczyk et al.

(10) Patent No.: US 6,775,269 B1
(45) Date of Patent: Aug. 10, 2004

(54) METHOD AND SYSTEM FOR ROUTING TELEPHONE CALLS BETWEEN A PUBLIC SWITCHED TELEPHONE NETWORK AND AN INTERNET PROTOCOL NETWORK

(75) Inventors: Casimir M. Kaczmarczyk, Plano, TX (US); Sivakumar Ravikumar, Dublin, OH (US); George A. Cowgill, Farmersville, TX (US); Bo Chen, Plano, TX (US); Ravindra K. Chillara, Dallas, TX (US); Atousa Raissyan, Vienna, VA (US); Hilder Mock, Cupertino, CA (US)

(73) Assignee: Telecom Technologies, Inc., Richardson, TX (US)

( * ) Notice: Subject to any disclaimer, the term of this patent is extended or adjusted under 35 U.S.C. 154(b) by 0 days.

(21) Appl. No.: 09/539,171

(22) Filed: Mar. 29, 2000

Related U.S. Application Data

(60) Provisional application No. 60/127,169, filed on Mar. 30, 1999.

(51) Int. Cl.[7] ............................................. H04L 12/66
(52) U.S. Cl. ...................................... 370/352; 370/401
(58) Field of Search ................................ 370/351, 356, 370/385, 392, 401, 402, 400, 420, 466, 467, 469; 379/15.02, 15.04, 88.17; 709/219, 227, 230, 238

(56) References Cited

U.S. PATENT DOCUMENTS

| | | | | |
|---|---|---|---|---|
| 6,041,109 A | | 3/2000 | Cardy et al. | 379/201 |
| 6,134,589 A | * | 10/2000 | Hultgren | 709/227 |
| 6,704,287 B1 | * | 3/2004 | Moharram | 370/242 |

\* cited by examiner

*Primary Examiner*—Phirin Sam
(74) *Attorney, Agent, or Firm*—Baker Botts L.L.P.

(57) ABSTRACT

A method for routing a telephone call originating at a first network that utilizes a first signaling protocol to a termination in a second network that uses a second signaling protocol includes receiving a services request associated with a calling party from the first network and translating the service request. The method also includes determining a route for processing the service request over the second network and generating signaling specifying the determined route. Determining the route for processing the request over the second network includes determining an address for the calling party and accessing a table associated with the address. The table includes a plurality of pointers to a plurality of additional tables. Determining the route also includes accessing at least one of the additional tables specified by at least one of the pointers, and, in response to accessing the at least one of the additional tables, determining the route for processing the request based on the at least one of the additional tables.

41 Claims, 24 Drawing Sheets

METHOD AND SYSTEM FOR ROUTING TELEPHONE CALLS BETWEEN A PUBLIC SWITCHED TELEPHONE NETWORK AND AN INTERNET PROTOCOL NETWORK

RELATED APPLICATIONS

This application claims benefit under 35 U.S.C. §120 of the filing of U.S. provisional application serial No. 60/127,169, entitled IntelligentIP, and having a filing date of Mar. 30, 1999.

TECHNICAL FIELD OF THE INVENTION

This invention is related to the field of telecommunications, and more particularly to a method and system for routing telephone calls between a public switched telephone network and an Internet protocol network.

BACKGROUND OF THE INVENTION

Communication networks are used extensively in today's society. There are many different types of communication networks, such as The Public Switched Telephone Network (PSTN), the Internet, and wireless networks. One problem faced today is communication between various types of networks. One of the reasons this communication can be difficult is because of the control language, or protocol, used by each to route messages. This problem may be particularly acute in transmission of telephone calls.

The Public Switched Telephone Network is generally a worldwide voice telephone network accessible to users with telephones and with access privileges. In the United States, this was formerly referred to as the Bell System Network or the ATT Long Distance Network. The command and control language of the Public Switched Telephone Network is built around a connection-oriented class structure. Call processing, the supervision and addressing of a call, is completed by a complex array of switches, processors and control networks.

Currently, the Public Switched Telephone Network uses a signaling system called Signaling System 7 (SS7). The SS7 protocol consists of four basis sub-protocols: a message transfer part, which provides the functioning for basic routing of signaling messages between signaling points; Signaling Connection Control Part (SCCP), which provides additional routing and management functions for transfer of messages other than call set-up between signaling points; Integrated Services Digital Network User Part (ISUP), which provides transfer of call set-up signaling information between signaling points; and Transaction Capabilities Application Part (TCAP), which provides for transfer of non-circuit related information between signaling points. This system has a class structure of specialized devices that perform single-purpose functions. A Class 5 Switch provides local access and call waiting; a Class 4 Switch provides long distance, 1-800-access and billing, for example. Connectivity is connection-oriented, i.e., two devices must establish a discrete, deterministic connection or voice channel before communication can begin, and this connection must remain in place for the duration of the call.

In contrast to the Public Switched Telephone Network, an Internet Protocol network, such as the Internet, use a different control language. This control language is the Internet Protocol (IP), which is a packet-based architecture. Packet networks are generally more economical than circuit switched networks (such as SS7). In an IP network, every packet of information carries all the necessary control information needed to connect the originating device to its destination using only the resources needed. This allows for uncomplicated (less) throttle points, geographic expansion, and transport integration.

An H.323 protocol environment or Session Initiation Protocol (SIP) provides a way for transmitting voice communications within IP networks. In general, H.323 define a set of call control, channel set-up, and code C specifications for transmitting real-time voice and video over networks that do not offer guaranteed service or quality of service—such as packet networks, and in particular, the Internet, local area networks, wide area networks, and Intranets. SIP is a session-layered control (signaling) protocol for creating, modifying and terminating sessions with one or more participants.

Communication of telephone calls between the Public Switched Telephone Network (which uses SS7 protocol) and IP networks (which additionally use H.323 protocol to transfer voice over the Internet protocol) have traditionally used complicated signaling gateways to perform conversions between the Public Switched Telephone Network signaling functions and the Internet Protocol Network signaling functions. One function that is performed in facilitating communication between various types of networks is determining through which route a telephone call will take place in the network in which the call will terminate. The route a telephone call takes place is comprised of a plurality of trunks. A trunk is a communication line between two switching systems, such as between a central office and a private branch exchange (PBX).

One problem with routing a telephone call, whether between networks of the same type or between different networks, is that complex signaling algorithms are utilized. These algorithms make modifying services to a customer or group of customers cumbersome.

SUMMARY OF THE INVENTION

Therefore, a need has arisen for an improved method and system for routing telephone calls. The present invention provides a system and method for routing a telephone call.

According to one embodiment of the invention, a method for routing a telephone call originating at a first network that utilizes a first signaling protocol to termination in a second network that uses a second signaling protocol includes receiving a service request associated with a calling party from the first network and translating the service request. The method also includes determining a route for processing the service request over the second network and generating signaling specifying the determined route. Determining the route for processing the request over the second network includes determining an address for the calling party and accessing a table associated with the address. The table includes a plurality of pointers to a plurality of additional tables. Determining the route also includes accessing at least one of the additional tables specified by at least one of the pointers, and, in response to accessing the at least one of the additional tables, determining the route for processing the request based on the at least one of the additional tables.

According to another embodiment of the invention, a method. A method for routing a telephone call originating at a first network that utilizes a first signaling protocol to termination in a second network that uses a second signaling protocol includes receiving a service request from the first network. The service request is destined for a called party within the second network. The method also includes translating the service request and determining a route for processing the service request over the second network. The method further includes generating signaling specifying the determined route. Determining the route for processing the request over the second network includes determining an address for the called party and accessing a table associated with the address. The table includes a plurality of pointers to a plurality of additional tables. The method also includes accessing at least one of the additional tables specified by at least one of the pointers, and, in response to accessing the at least one of the additional tables, determining the route for processing the request based on the at least one of the additional tables.

Embodiments of the invention provide numerous technical advantages. For example, routing telephone calls between various types of networks allows service providers to combine or unify legacies, circuit-switched networks, and new IP-based solutions where it makes the most sense. Service providers do not need to displace networks in order to develop next generation enhanced services. Instead, they benefit from the best of both worlds (circuit switched and IP-based networks), protecting their existing investment while reducing dependency on proprietary architectures.

Furthermore, embodiments of the invention enable technology vendors to interoperate with other elements in media-controlled or service layers, without having to maintain currency with other vendors' technology. Embodiments of the invention also allow call routing to be effected through a plurality of nested tables, which are easily modifiable to modify a customer's services. For example, allowing a particular person to place a 1-900 call is simply effected by changing an entry in a table. Furthermore, the invention allows scalability and flexibility by allowing a subscriber to add tables as needed and add to the tables as needed. Therefore, very complex sets of services and privileges may be easily provisioned not only for a group of subscribers but also can be easily provisioned for a single subscriber.

Other technical advantages are readily apparent to one skilled in the art from the following figures, descriptions and claims.

BRIEF DESCRIPTION OF THE DRAWINGS

For a more complete understanding of the present invention and the advantages thereof, reference is now made to the following description taken in connection with the accompanying drawings in which.

DETAILED DESCRIPTION OF EMBODIMENTS OF THE INVENTION

Example embodiments of the invention are best understood by referring to FIGS. 1 through 15 of the drawings like numerals being used for like and corresponding parts of the various drawings.

Figure 1:
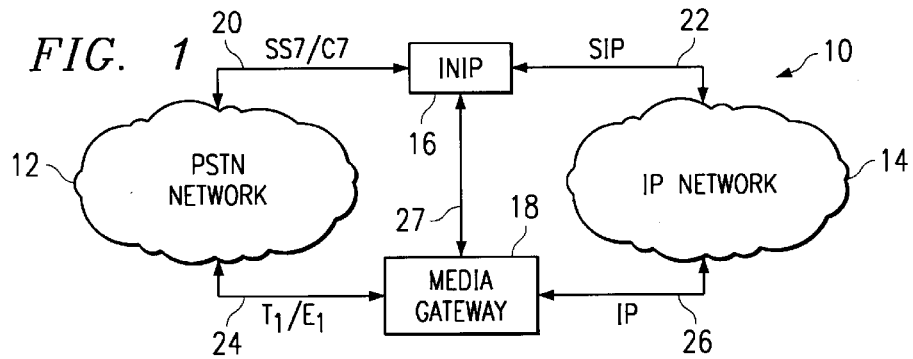
FIG. 1 is a block diagram of a communications network utilizing the teachings of the present invention, including a call routing and signaling system for routing a call between a public switched telephone network and an Internet Protocol network of the communication system.

FIG. 1 is a block diagram of a communications network 10 utilizing the teachings of the present invention. Communication network 10 includes a public switched telephone network 12 and an Internet Protocol network 14. A call routing and signaling system 16 and a media gateway 18 provide connectivity between public switched telephone network 12 and Internet Protocol network 14.

Public switched telephone network 12 is one example of a network that utilizes Signaling System 7 (SS7) signaling protocol to control call processing. In this embodiment, public switched telephone 12 is a worldwide voice telephone network, which in the U.S. was formerly known as the Bell System Network or the ATT Long Distance Network; however, public switched telephone network 12 represents any network having a first type of communication protocol, for example SS7, that is different from that of another network with which it communicates, such as Internet Protocol. Public switched telephone number 12 uses SS7 protocol to control calls within a network and outside the network, as shown by reference number 20.

Internet Protocol network 14 is a network that utilizes Internet Protocol for communications, and in particular, in this example, Session Initiation Protocol (SIP); however, Internet Protocol network 14 represents any network that utilizes a second type of communication protocol, for example, Internet Protocol, that is different from that of another network with which it communicates, such as SS7. SIP supports five facets of establishing and terminating multi communications: user location (determination of the end system to be used for communication); user capabilities (determination of the media and media parameters to be used); user availability (determination of the willingness of the calling party to engage); call setup ("ringing," establishment of call parameters of both called and calling party); and call handling (including transfer and termination of calls).

Call routing and signaling system 16 is implemented in this example by a combination of software and hardware known as Intelligent IP (INIP) and is described in greater detail below in conjunction with FIG. 2A. Call routing and signaling system 16 provides SS7 protocol to Internet Protocol interface and coordinates the SS7 view of Internet Protocol elements and the Internet Protocol view of SS7 elements. Call routing and signaling system 16 performs functions analogous to the service switching point, or signal switching point (SSP), traditionally used within an SS7 network.

A media gateway 18 terminates switched telephone lines in public switch telephone network 12 and packetized media streams for Internet Protocol transport over Internet Protocol Network 14. Media gateway 18 terminates public switched telephone lines, which may be T1 lines, E1 lines or other suitable media, as denoted by reference numeral 24. On the Internet Protocol network 14 side of media gateway 18, are lines 26 which may also be T1, E1 or other suitable lines, but carry Internet Protocol transmissions. Media at gateway 18 and call routing and signaling system 16 utilize a Media Gateway Control Protocol (MGCP), which is a combination of the Internet Protocol Device Control (IPDC) specification and the simple Gateway Control Protocol (SGCP), which enable external control and management of media gateway devices by software programs known as call agents or media gateway controls to communicate over line 27.

Communication network 10 operates as follows: A service request, or call, originates at public switched telephone network 12. Signaling associated with the call, which in this embodiment is according to the SS7 protocol, travels to signaling gateway 16, as denoted by reference numeral 20. Call routing and signaling system 16 receives the SS7 signaling, converts the signaling into an internal format, processes the calls, and generates SIP signaling, as denoted by reference 22, for transmission to IP network 14. The content of the call travels over public switched telephone lines 24 through media gateway 18 and over line 26, now according to Internet protocol for termination within Internal Protocol network 14. Calls originating from Internet Protocol network 14 are handled in a converse matter.

Figure 2A:
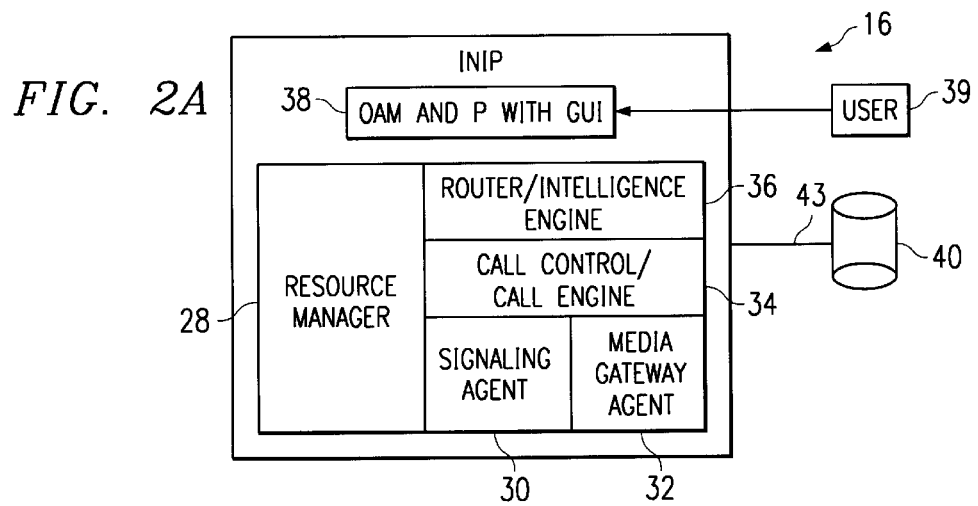
FIG. 2A is a block diagram of a call routing and signaling system of FIG. 1, which includes a call control engine.

FIG. 2A is a block diagram of call routing and signaling system 16, which comprises a plurality of hardware and software forming various functional units. Call routing and signaling system 16 includes a resource manager 28, a signaling agent 30, a media gateway agent 32, a call control engine 34, a router/intelligence engine 36, and OAM & P GUI 38.

Resource manager 28 determines and stores the trunks associated with both public switched telephone network 12 and Internet Protocol network 14 that are in use; therefore, source manager 28 knows which trunks are out of service.

Signaling agent 30 translates messages received from either public switched network 12 or IP network 14 for call control engine 34, and provides signaling necessary to route calls to either public switched network 12 or IP network 14 based on the route determined by call control engine 34 and router/intelligence engine 36.

Call control engine 34 performs a number of functions, which are described in detail below. For example, call control engine 34 validates that a calling party is a valid caller, determines what services are available for the caller, determines what to do with the call, and once it figures out what to do with the call, packages the call and sends it to router/intelligence engine 36. Call control engine may communicate with external databases 40 over communication line 43 to process calls. Call control engine is described in greater detail below in conjunction with FIGS. 2B through 15.

Router/intelligence engine 36 performs functions related to call control. Router/intelligence engine 36 determines what route the call will take, and in doing so, also communicates with database 40 over line 42.

OAM & P with GUI 38 provides user interaction through a graphical user interface to allow a user 39 to configure network controller 16 and provision tables in database 40. Additional details of database 40 are described in conjunction with FIG. 2B.

Figure 2B:
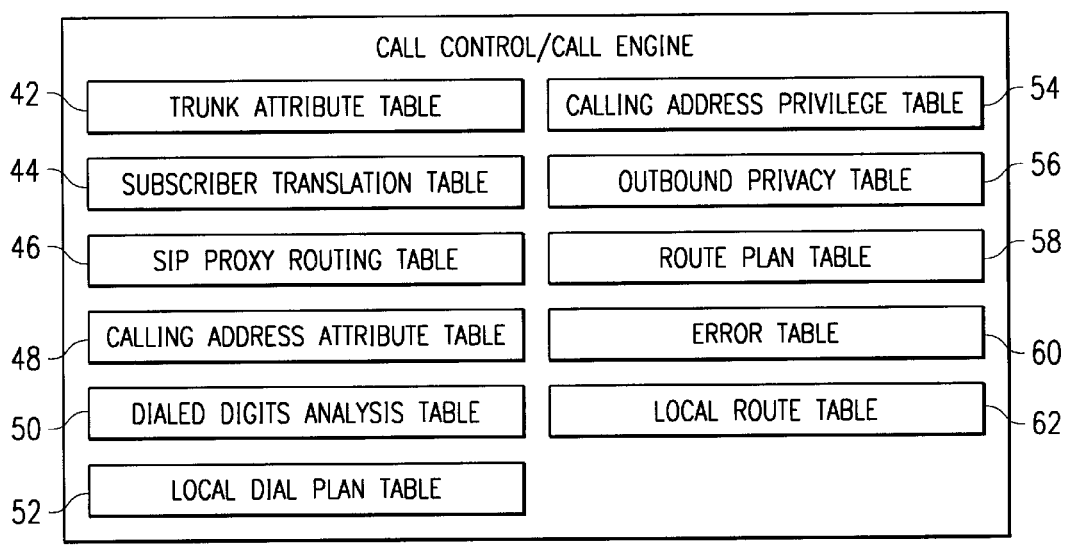
FIG. 2B is a block diagram of a database storing a plurality of tables for use with the call control engine of FIG. 2A.

FIG. 2B is a block diagram of database 40 shown in FIG. 2A. These tables include a trunk attribute table 42, a subscriber translation table 44, a SIP proxy routing table 46, a calling address attribute table 48, a dialed digits analysis table 50, a local dial plan table 52, a calling address privilege table 54, an outbound privacy table 56, a route plan table 58, an error table 60, and a local route table 62. Examples of each of these tables are provided below in TABLES 1 through 9 and 11, and are described below in conjunction with the FIGS. 5A through 15. These tables point to additional tables that are not explicitly shown in FIG. 2B. For example, route plan table 58 points to many route tables (as described in greater detail below), including, for example, TABLE 10: LD InterLATA Table.

Figure 3:
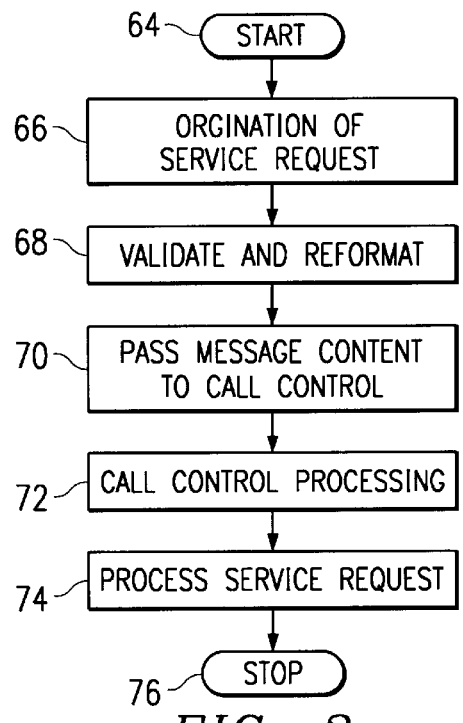
FIG. 3 is a flow chart illustrating steps associated with the call routing and signaling system of FIG. 1 while processing a service request, or call, over the communication network of FIG. 1.

The operation of call routing and signaling system 16 is described herein conjunction with FIG. 3 and with reference to FIGS. 1 and 2A.

FIG. 3 is a flow chart illustrating steps associated with call control engine 34 processing a service request, or call, over communications network 10. In operation, at a step 66 a service request is originated from within either public switched network system 12 or Internet Protocol 14, and signaling is sent (SS7 or SIP) to signaling agent 30. Signaling agent 30 translates that signaling for call control engine 34 at step 68. Among other things, this formatting provides a calling address format required by call control engine 34. The translated message is passed to call control engine 34 at step 70. Call control engine 34 and route intelligence engine 36 process the call at step 72, determining the route the call should take. In particular, resource manager 28 informs router/intelligence engine 36 of the available trunks over which a call may be routed in response to call processing by call control engine 34, and router/intelligence engine 36 selects the route accordingly. Call control engine 34 processing includes determining the calling address privilege level and the call type and call attributes being requested. Router/intelligence engine 36 in conjunction with resource manager 28 verifies the destination requested is a valid telephone number and will calculate the appropriate route to use to terminate the call. In response to the selection of appropriate trunks, gateway agent 32 communicates with media gateway 18 over line 27 using Media Gateway Control Protocol.

According to the teachings of the invention, call control engine 34 and router/intelligence engine 36 process a call through a series of indexed tables in database 40 that are easily modified. Because a call processing is determined by table entries, the way in which calls are processed may be changed efficiently without complex new programming typically associated with routing calls. Additional details of call processing by call control engine 34 and router/intelligence engine 36 are described below in conjunction with FIGS. 4A through 15.

Figure 4B:
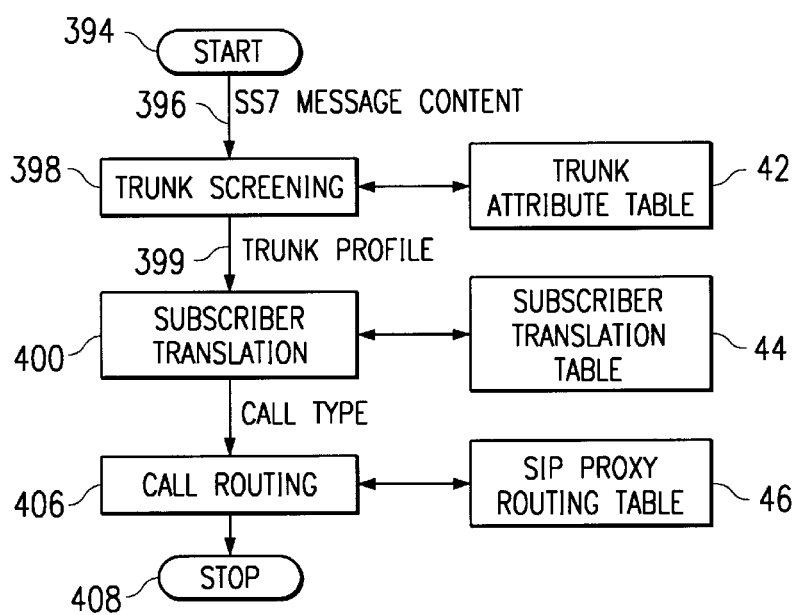
FIG. 4B is a flow chart showing steps associated with the call control engine of FIG. 2A processing a service request, or call from the public switched telephone network to the Internet Protocol network of the communication network of FIG. 1.
Figure 4A:
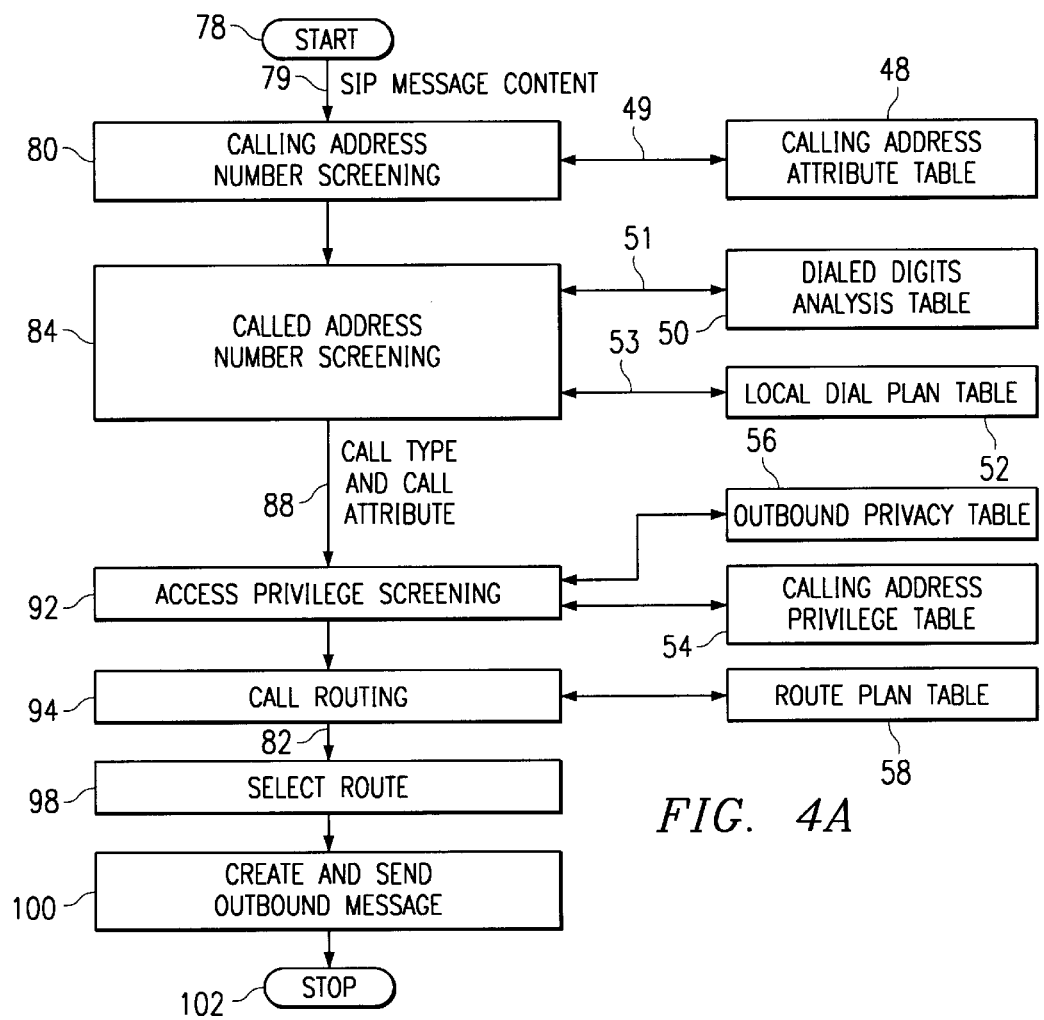
FIG. 4A is a flow chart showing steps associated with the call control engine of FIG. 2A while processing a service request, or call, from the Internet Protocol network to the public switched telephone network of the communication network of FIG. 1.

FIG. 4A is a flow chart showing additional details of steps associated with call control engine 34 processing a service request or call, from Internet Protocol network 14 to public switched telephone network 12. The process begins at step 78 where a translated SIP message is received by call control engine 34 from signaling agent 30, as denoted by reference numeral 79. Generally, call control engine 34 creates an instance of a calling address profile, indicated by reference numeral 82, for each service request received. A calling address profile is comprised of data defining the call type, with associated call attributes, the clients call privileges, and the final routing information to be used to determine the call. An example of a calling address profile 82 is calling address profile 166 in FIG. 5B. Call control engine 34 generates respective portions of calling address profile 82 by screening the calling address number (step 80), screening the called address (step 84), screening access privileges (step 92), and routed/intelligence engine 36 determining the call routing (step 94) and selecting an appropriate circuit (step 98). Each portion of calling address profile 82 generated by each of these steps is available for use in the subsequent step. Calling address profile 82 is used at the end of this process to create and send outbound messages.

At a step 80, call control engine 34 screens the calling party by examining the calling address from the translated Internet Protocol message. In this embodiment, the calling address received by call control engine 34 may be alphanumeric, in URL or e-mail format, digits in E.164 or NPA-NXX-XXXX format, or other suitable format. To screen the calling address number, call control engine 34 retrieves information from calling address attribute table 48 that define the caller's access privileges, a dialed digits analysis to use, and the client's special routing instructions, denoted by reference numeral 49. Calling address attribute table 48 provides a calling privilege index, a dialed digit analysis index, a local dial plan index, a route plan index, a treatment index, a PIC code, an LPIC, a billing index, originating information, jurisdiction information, the home NPA or "911" routing table, and an outbound privacy index associated with that calling address and billing address. Each of these terms are defined below in conjunction with TABLE 4: Calling Address Attribute Table.

If the calling address is not found in calling address attribute table 48, error processing is invoked. Error table 60 (FIG. 2B) is accessed through the treatment index in calling address attribute table 48. Error table 60 treats the call accordingly, based on the treatment index and the error code. If a treatment index is not associated with the calling party, a default error table is used.

If the calling address is found in calling address attribute table 48, call control engine 48 screens the called address number at step 84. Call control engine 34 accesses dialed digits analysis table 50 and local dial plan table 52 to screen the called address, as denoted by reference numerals 51 and 53. At this step, call control engine 34 determines from called digits analysis table 50 the call type with associated attributes 88 (see also FIG. 5B). Additionally, at this step, call control engine 34 analyzes the called party's local dial plan to determine if the dialed digits conform to the dialing standards required by the local calling area.

Once the call type and call attributes 88 have been determined but before moving on to the next step, call control engine 34 uses a local dial plan index (from calling address attribute table 48) to retrieve the local dial plan table 52 specific to the calling party. Data in local dial plan table 52 dictates the maximum and minimum format required to be dialed for each call case. If a local dial plan requirements have been violated, an error will be generated and error processing will be invoked.

Once call control engine 34 completes address number screening at step 84, call control engine 34 screens access privileges at step 92. To do so, call control engine 34 may utilize calling address privilege table 54. At this step, call control engine 34 assesses call type and call attributes 88 to determine if the calling address has the privileges to place the call. Call control engine 34 identifies privilege levels and provide a user, such as user 39, the ability, through OAM & P 38 and to assign, modify, or remove any combination of privileges to any calling address. According to one embodiment, the following privileges may be assigned: emergency services (e.g., 911) local and special codes and service, operator assisted, Intra-LATA toll calls, international calls, carrier access code (CAC) calls, and service access code (SAC)calls, (e.g., 800, 900). Additional calls that may be provided are SIP address calls and per use calls.

If call control engine 34 finds the calling address does not have the privilege level to complete the call requested, an error will be generated and error processing will be invoked. If the calling address does have the privilege to complete the call, then a call type allowed flag (not explicitly shown) is set and call control engine and router/intelligence engine 36 route the call at step 94. At this step 94, call control engine 34 retrieves outbound privacy information using an outbound privacy index (index 132 in FIG. 5A) stored in calling address attributes table 58. This index 132 indicates which outbound privacy table 56 call control engine 34 looks to determine privileges.

This outbound privacy table 56 dictates whether or not privacy indicators need to be set in the terminating public switched telephone network message. Privacy may be required for the calling party address, the calling party name, or the calling party IP address. Privacy may be indicated for any of these parameters in one of three ways: the SIP message header may include a parameter indicating that privacy should be invoked; alternatively, the dialed digits may contain the *67 prefix indicating privacy; lastly, a subscriber may specify privacy across all calls. In the last case, outbound privacy table 56 states which parameters need to be suppressed. If any of these three indicators is detected by call control engine 34, the appropriate calling party information is suppressed in the final public switched telephone network message.

Once access privilege screening is completed, call control engine 34 uses a route plan index (index 116 in FIG. 5A) together with the call type and call attributes 88 to retrieve an appropriate route list table. A route list table is a table specified by route plan table 58 and specifies a set of routes, or route set, that may be used to complete the call. Example route list tables are found in the third column of TABLE 9: Route Plan Table. Call type and call attributes 88 are keys to route plan table 58 (e.g., they determine which values from the table are used).

Once call control engine 34 determines the route at step 94, calling address profile 82 is complete, as indicated by reference numeral 82 between steps 94 and 98. Call control engine 34 uses calling address profile 82 and call type and call attributes 88 to determine the route to use to complete the call request and to formulate the public switched telephone network message to be sent, and provides the determined route, or route set, to resource manager 28 to choose the outbound circuit at step 98. Call control engine 34 receives the outbound circuit and sends it and the calling address profile at step 100 to signaling agent 30 to create and send the public switched telephone network call setup message, per, in this example, GR3 317 specifications. The process concludes at step 102.

Communication of calls originating at public switched telephone network 12 and terminating at Internet Protocol network 14 are analogous and are described below.

FIG. 4B is a flow chart showing additional details of steps associated with call control engine 34 processing a service request, or calls from public switched telephone network 12 to Internet Protocol network 14. The method begins at step 394 where signaling agent 30 provides a translated SS7 message to call control engine 34, as denoted by reference numeral 396. Generally, call control engine 34 identifies the called party (rather than calling address), call type and attributes, and determines the destination at which the call should terminate. This process is described below.

At a step 398, call control engine 34 performs trunk screening. Call control engine 34 creates an instance of a called party profile (not explicitly shown) for each service request received. This is in contrast to calling address profile 82 created for calls originating in Internet Protocol network 14. As with the calling address profile 82, a called party profile is comprised of data defining the call type and call attributes, such as call type and call attributes 88, called party call privileges, and the final routing information to be used to terminate the call. Therefore, call control engine 34 accesses tables based upon the called number that define the called party's destination, privileges, and special routing instructions.

Call control engine 34 uses the trunk identification provided by translated SS7 message 396 to access trunk attribute table 42. Trunk attribute table 42 contains a subscriber translation index, an SIP proxy routing index, the call attribute/call type index, and CLLI. The subscriber translation index points to subscriber translation table, which provides formats for the calling party (or called address in case of on-net calls). The SIP proxy routing index in trunk attribute table 42 (see TABLE 1: Trunk Attributes Table) is the pointer to the SIP proxy routing table, which provides the SIP proxy to be used on the domain. The call type attribute index in trunk attribute table 42 defines what call types are associated with the trunk. The CLLI index in trunk attribute table 42 provides the common location language identifier that is associated with the trunk and will be populated in SS7 messages.

If the trunk ID is not found in trunk attributes table 42, call control engine 34 assumes there are no special privileges to find and proceeds to call type identification. If the trunk ID is found, the called party privileges are returned and used to determine whether the call should be terminated. This helps determine how the call is routed. If a processing error arises, an error is generated and error processing is invoked.

On completion of trunk screening, call control engine 34 identifies the call type at step 400 of trunk screening. Trunk screening at step 98 provides an index for subscriber translation table 44 for the incoming trunk identification in trunk attribute table 42. When call control engine 34 accesses subscriber translation table 44, if an SIP URL, IP address, or e-mail address is associated with the number, this specifies that the termination is an SIP termination. However, if there is no SIP URL IP address, or e-mail address, this specifies that the termination is a non-SIP termination.

Step 100 of subscriber translation generates a call type 88. Based on call type 88, trunk profile 99, and the original translated SS7 message, call control engine 34 performs access privilege screening in an analogous manner as the access privilege screening of step 92, described above in conjunction with FIG. 4A.

At a step 406, call control engine 34 routes the call. To do so, remaining data necessary to create and route an SIP message are assembled at step 406. This includes identifying the destination proxy. To accomplish this task, call control engine 34 determines the called party's domain name from the SIP address. The domain name is then used as a key in accessing SIP proxy routing table 46. SIP proxy routing table 46 dictates which proxy is used to terminate the call. SIP proxy routing table 46 also allows user 39 to assign several NPA-NXXs to one CMS. The process concludes at step 108. Ancillary network and subscriber services may also be invoked in the above process.

Figure 5A:
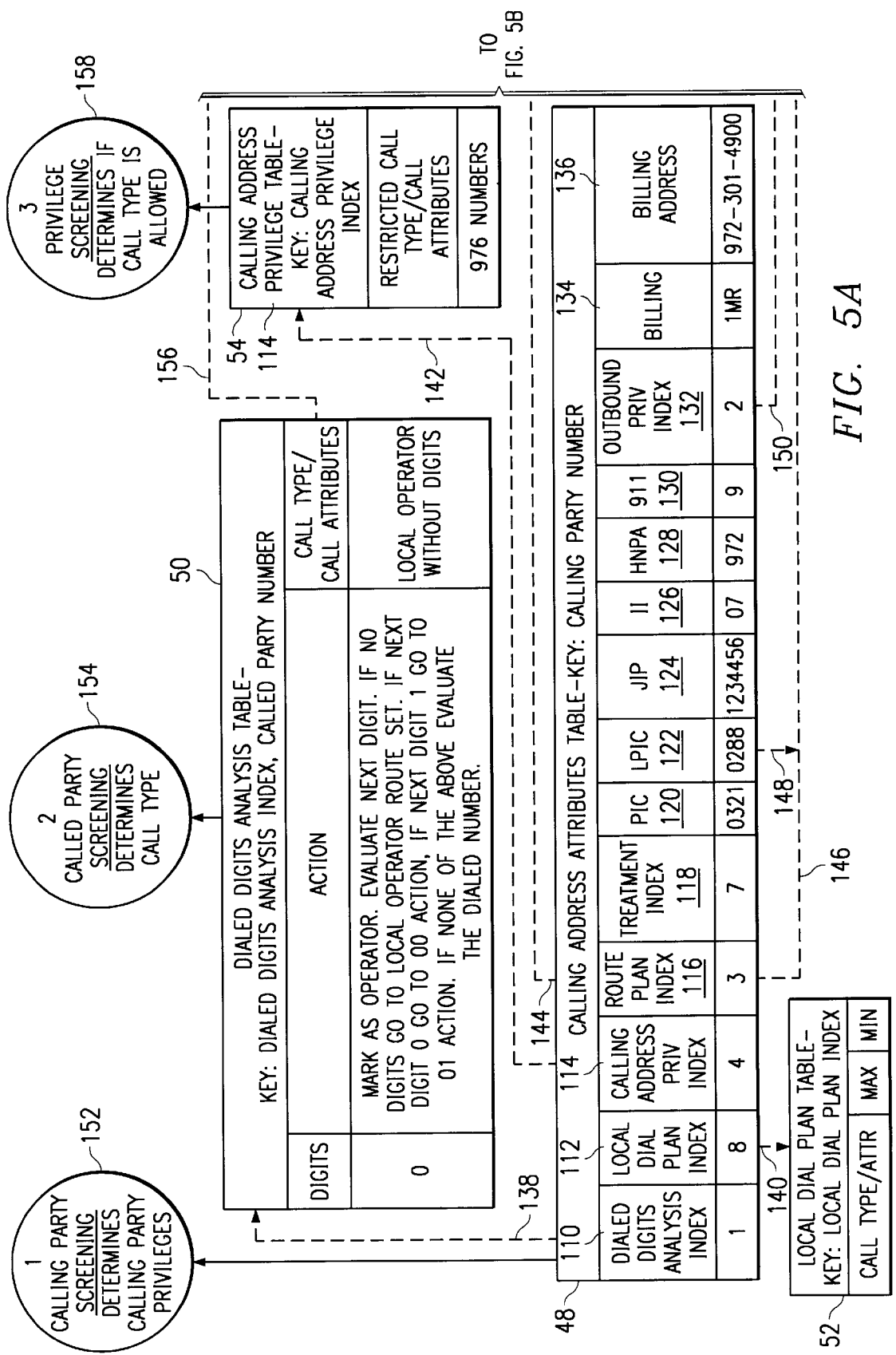
FIGS. 5A and 5B are schematic drawings showing tables and steps associated with the call control engine of FIG. 2A processing an operator services call, with no number provided, originating from the Internet Protocol network for termination in the public switched telephone network of FIG. 1.
Figure 5B:
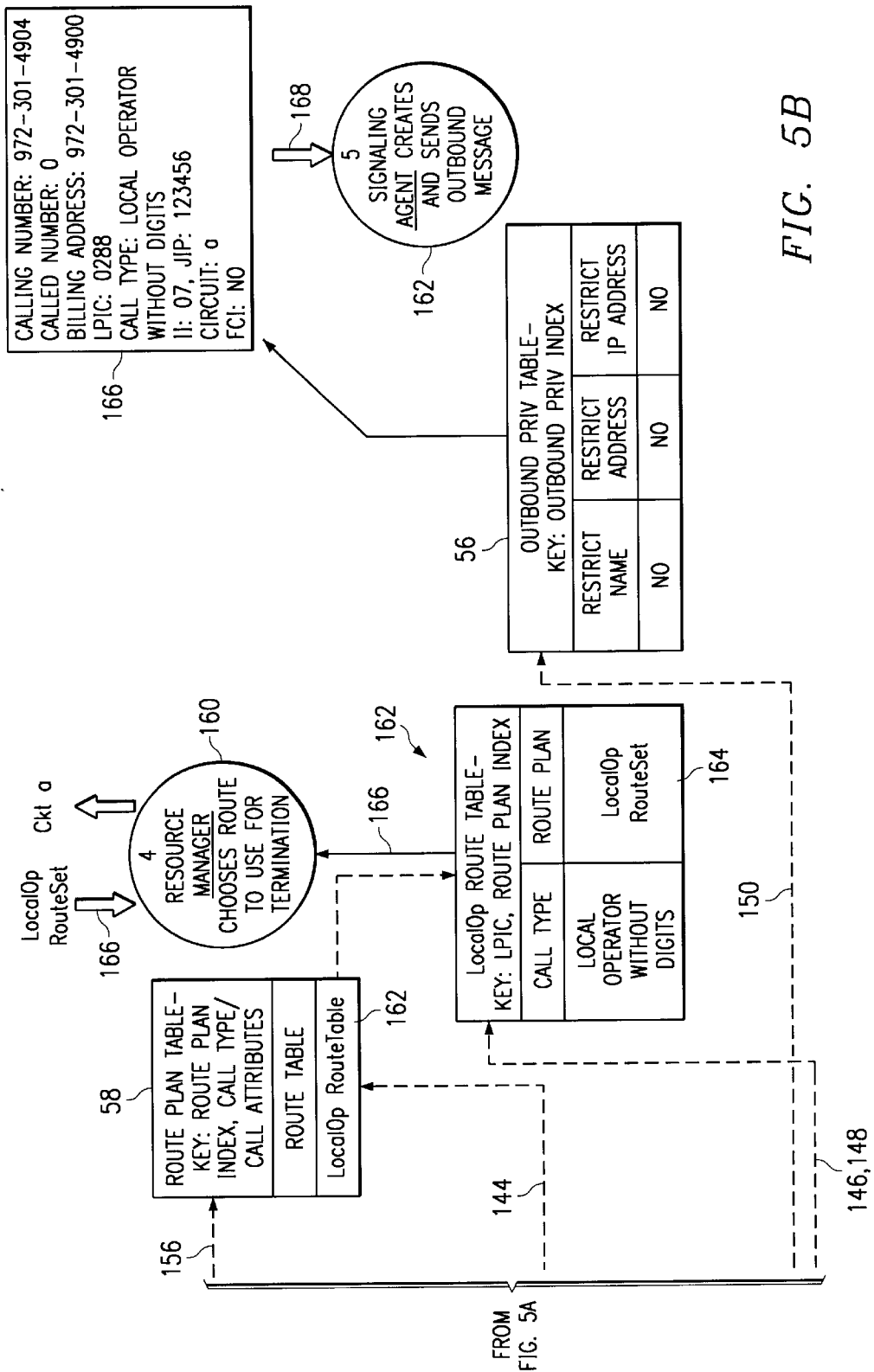

The following FIGS. 5A through 5B provide examples of call processing for calls originating at Internet Protocol network 14, and terminating at public switched telephone network for a plurality of different types of calls. For all examples, the number of the calling party is "972-301-4900."

FIGS. 5A and 5B are schematic drawings showing tables and steps associated with the call control engine 34 processing an operator services call, with no number provided, originating from the Internet Protocol network for termination in the public switched telephone network of FIG. 1. In this example, a caller calls from IP network 14 to a destination in public switched telephone network 12. In this example, the called number is simply "0", indicating an operator.

Calling address attributes table 48 (which is also shown as TABLE 4: Calling Address Attributes Table) includes a plurality of indices. Those indices are: dialed digits analysis index 110, local dial plan index 112, calling address privilege index 114, route plan index 116, treatment index 118, "911" index 130, and outbound privacy index 132. Calling address attributes table 48 also includes variables that are not indices, but rather actual values. Those are: PIC 120, LPIC 122, JIP 124, II 126, HNPA 128, billing 134, and billing address 132. Each of these indices or variables is described in greater detail below in conjunction with TABLE 4: Calling Address Attributes Table.

A key for calling address attribute table 48 is the calling party number. In other words, a calling address attribute table exists for each calling party number. The calling party number, or calling address, may be alphanumeric, may be in URL or e-mail format, or may be digits in e.164 or NPA-NXX-XX format.

Dialed digits analysis index 110 is a pointer to dialed digits analysis table 50, as indicated by reference number 138. Local dial plan index 112 is a pointer to local dial plan table 52, as indicated by reference number 140. Local dial plan table 52 identifies, based on the calling party, what the user's local dial plan looks like, i.e., for each particular call type, the format of the number, including maximum and minimum number of digits. Calling address privilege index 114 is a pointer to calling address privilege table 54 as indicated by referenced numeral 142. Calling address privilege table 54 identifies the call type restrictions for a particular calling party. Route plan index 116, which is based on the calling party, along with other keys, is a key to route plan table 58, as demonstrated by reference numeral 144.

Route plan table 58 specifies a route list table, such as route list table 162 (FIG. 5B). Route list table 162 in turn specifies which route set to use, which is based on the calling party's profile (route plan index 116) and other factors as the case may be, such as call type, and LPIC index 122 and PIC index 120.

Treatment index 118 is a pointer to error table 60. Error table 60 is used to decide what type of treatment to use based on a particular error condition and the calling address. PIC 120 is the calling party's long distance carrier ID code. LPIC 122 is the calling party's local service provider carrier ID code and is used as a key to route list table 162, as denoted by reference numeral 148. LPIC 122 is provided in this example to local route table 62 as indicated by reference numeral 148. JIP 124 refers to jurisdiction information and identifies the switch from which the call originates and can be recorded to identify that switch. II 126 identifies the originating line. For example, if the calling party is calling from a prison phone, pay phone, or regular phone.

HNPA (Numbering Plan Area) index is the home NPA, which defines the NPA for the calling party. "911" index 130 is a pointer to the 911 route table to identify what 911 route set to use for the calling user. Outbound privacy index 132 is a pointer to outbound privacy table 56, as indicated by reference numeral 150. Billing 134 identifies the billing rate to use for the calling user. Billing address 136 is the address that the call is billed to, and may be alphanumeric, URL, or e-mail format, or may be digits in E164 or NPA-NXX-XXXX format.

Call control engine 34 processes this example call as described below. At step 152, call control engine 34 screens the calling party to determine the calling party privileges. To do this, call control engine 34 examines calling address attribute table 48. In particular, the caller in this example has a calling party privilege index 114 of "4." This index therefore points to a particular calling address privilege table 54 that has only "976" numbers restricted.

At step 154 call control engine 34 screens the called party to determine the call type. In particular, dialed digits analysis index 110, which for this calling party is "1", points to a particular dialed digits analysis table 50. Based on dial digits in analysis table 50, the call type and call attributes 88 is determined to be "local operator call without digits." The call type and call attributes 88 for this particular call are used as a key to select an appropriate route list table from route plan table 58, as denoted by reference numeral 156.

At step 158, call control engine 34 screens privileges to determine if the particular call type 88 is allowed. In this example, the call type 88 is a local operator call without digits. Calling address privilege index 114 identifies a calling address privilege table 154, which specifies that the only restrictions on the calling party are 976 numbers; therefore, the call type is allowed.

A route plan table 58 is indexed by route plan index 116 and call type and attributes 88. These two indices specify the route list table listed in route plan table 58 that is be used for the call. In this example, the route list table selected (162) is identified as "LocalOp" Route Table. Selected route list table 162 is an example of a plurality of route list tables that include a list of routes that can be used to terminate the call request. This list is referred to as a route set. In this example the route set is "LocalOp Route Set" 164. This route set 164 is passed, as denoted by reference numeral 166, for use by resource manager 28 to choose the route, or outbound circuit (denoted by "Ckt a"). Route manager 28 chooses the outbound circuit by mapping the route set to different CLLIs. The CLLIs point to a trunk group, and there are different circuits in each trunk group. Call control engine 34 receives the outbound circuit and provides it and calling address profile 166 to signaling agent 30, as denoted by reference numeral 168. At step 162, signaling agent 30 creates and sends the outbound message based upon the selected circuit and incorporates any outbound privacy restrictions denoted by outbound privacy table 56. In this case no outbound privacy restrictions are in place. In addition, signaling agent 30 formats information received from call control engine 34 into a proper signaling format message.

Figure 6A:
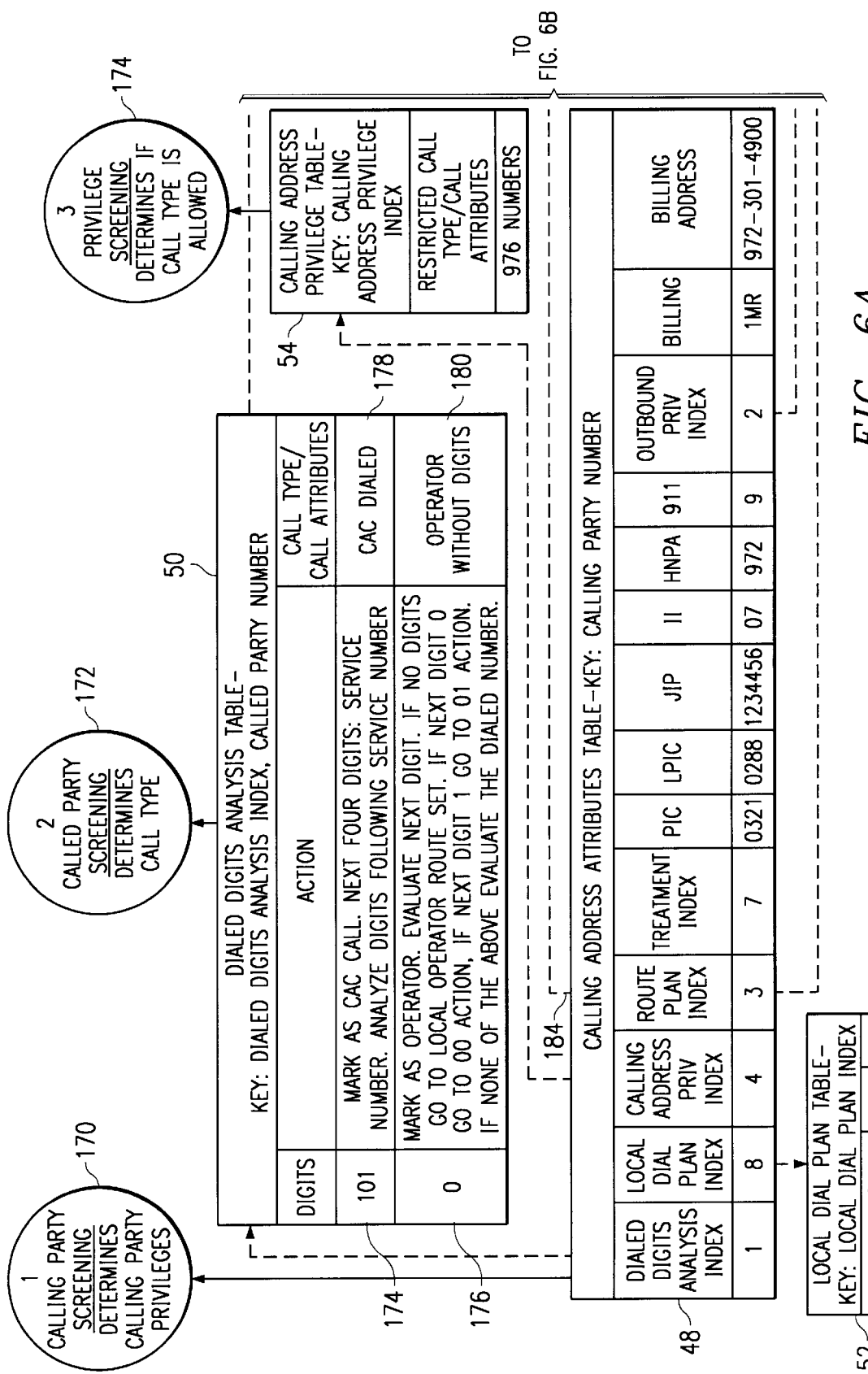
FIGS. 6A and 6B are schematic drawings showing tables and steps associated with the call control engine of FIG. 2A processing a carrier access code service request, dialed without digits, originating from the Internet Protocol network for termination in the public switched telephone network of FIG. 1.
Figure 6B:
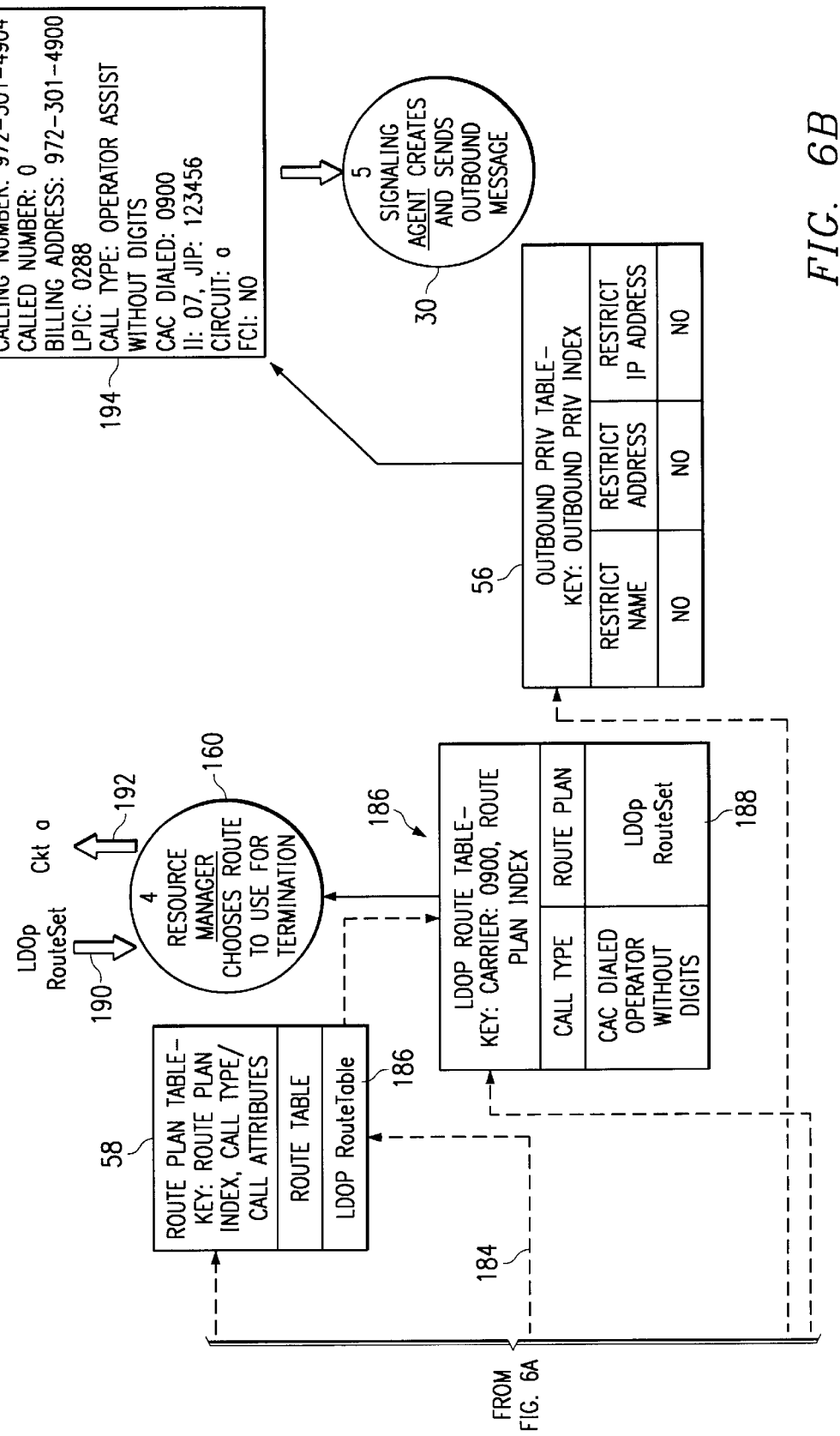

FIGS. 6A and 6B illustrate processing of a carrier access code call that is dialed without digits "10109000." In this example, "0900" represents the carrier. Differences between call control engine 34 processing the call of FIGS. 5A and 5B and call of FIGS. 6A and 6B are highlighted below.

The calling address specifying table 48 is the same as in FIGS. 5A and 5B because this table is keyed off of the calling party address, which is the same (972-301-4900). At a step 170, call control engine 34 screens the calling party in calling party a similar manner to step 152. At a step 170, call control engine 34 screens the called party. Call control engine 34 screens the called party using dial digits analysis table 50, using dialed digit analysis index 110 and the called party number as keys. In this example, the called party number is "10109000." The first three digits "101" indicate that the call is a carrier access code call, as denoted by reference numeral 174. Call control engine 34 then examines the next four digits of the call, which in this case is the service number, or identifier of the actual carrier (0900). The next digit examined "0", specifies the call is to an operator, as denoted by reference numeral 176. Call control engine 34 then evaluates the next digit. In this case, there are no digits, so a call attribute of operator without digits is set, as denoted by reference numeral 180.

Thus, the dialed digits are analyzed to determine call attributes (such as blocking calling party ID presentation—*67) and call type (such as operator, long distance, international, local, etc.). If additional digits were dialed, such as the actual phone number of a called party, they are analyzed after the appropriate route table is located.

Route plan table 58 uses call type and attributes 88, as denoted by reference numeral 182 as a key in selecting an appropriate route list table. In addition, route plan table 58 also uses as a key route plan table index 116, as denoted by reference numeral 184. Based on route plan index 116 and call type and attributes 88, call control engine 34 selects the appropriate route list table from route plan table 58. In this example, the selected route list table 186 is "LDOP Route Table 186." Route list table 186 stores the list of routes that can be used to terminate the call request, or route set 188. Resource manager 28 provides route set 188, as described above and indicated by reference numeral 190. In response, resource manager 28 chooses the outbound circuits as designed by reference numeral 192. Call control engine 34 adds the determined circuit information to call address profile 194 and provides it to signaling agent 30, as indicated by reference numeral 196. Signaling agent creates and send the outbound message according to provided data 194.

In this manner, the call is processed.

Figure 7A:
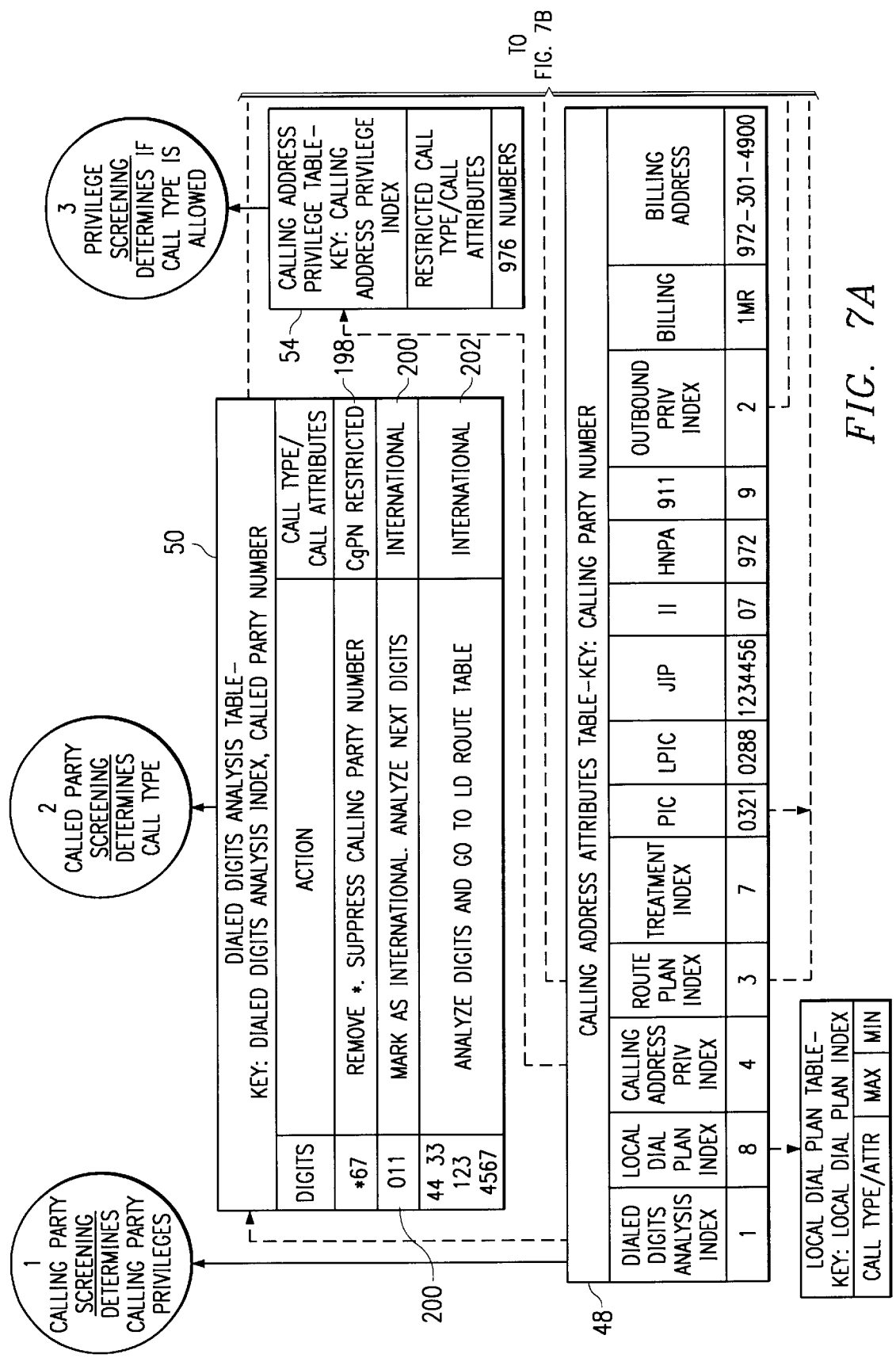
FIGS. 7A and 7B are schematic drawings showing tables and steps associated with the call control engine of FIG. 2A processing an international, calling party requested, service request originating from the Internet Protocol network for termination in the public switched telephone network of FIG. 1.
Figure 7B:
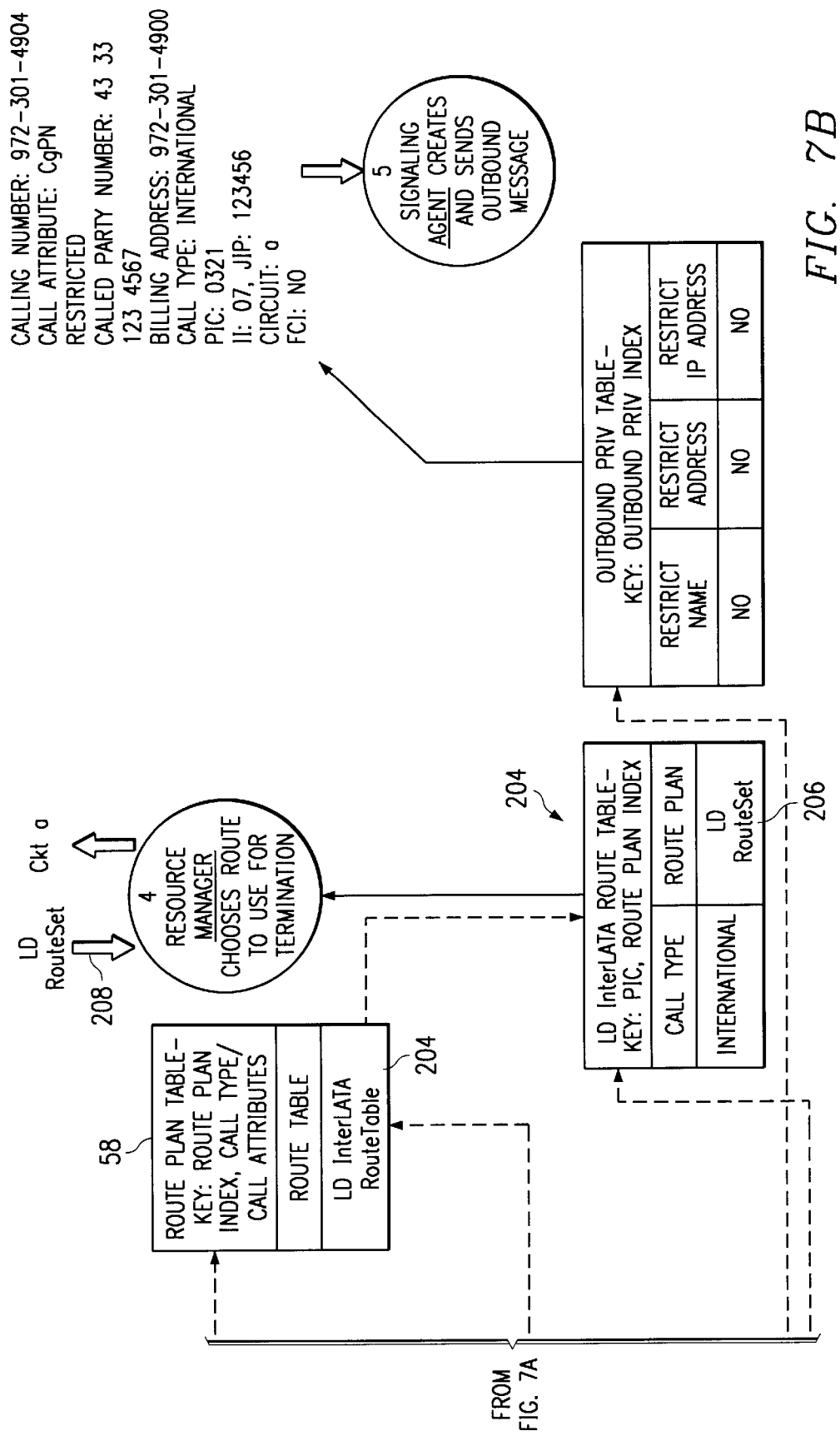

FIGS. 7A and 7B illustrates the call processing of an international calling party restricted phone call, which in this example is "*6701144331234567." Only differences between call processing of FIGS. 5A and 5B and 7A and 7B are described.

Based on the dialed digits (*6701144331234567), dialed digits analysis table 50 is accessed. The digits "*67" indicate to suppress the calling party number, as indicated by reference numeral 198. Call control engine 34 determines the call is an international call based on the digits "011." The remaining digits (44331234567) do not affect how the tables are accessed, but are analyzed in conjunction with an appropriate route table, as indicated by reference numeral 202.

Based on the call type and attributes 88 for this called number found in dialed digit analysis table 50, and route plan 116, call control engine 34 uses route plan table 58 to select an appropriate route list table 204, which in this case is "LD Inter LATA" route table. Route list table 204 specifies route set 206. Call control engine 34 provides route set 206 to resource manager 28, as indicated by a reference numeral 208. Resource manager 28 selects an appropriate circuit for terminating the call as indicated by reference numeral 210.

Figure 8A:
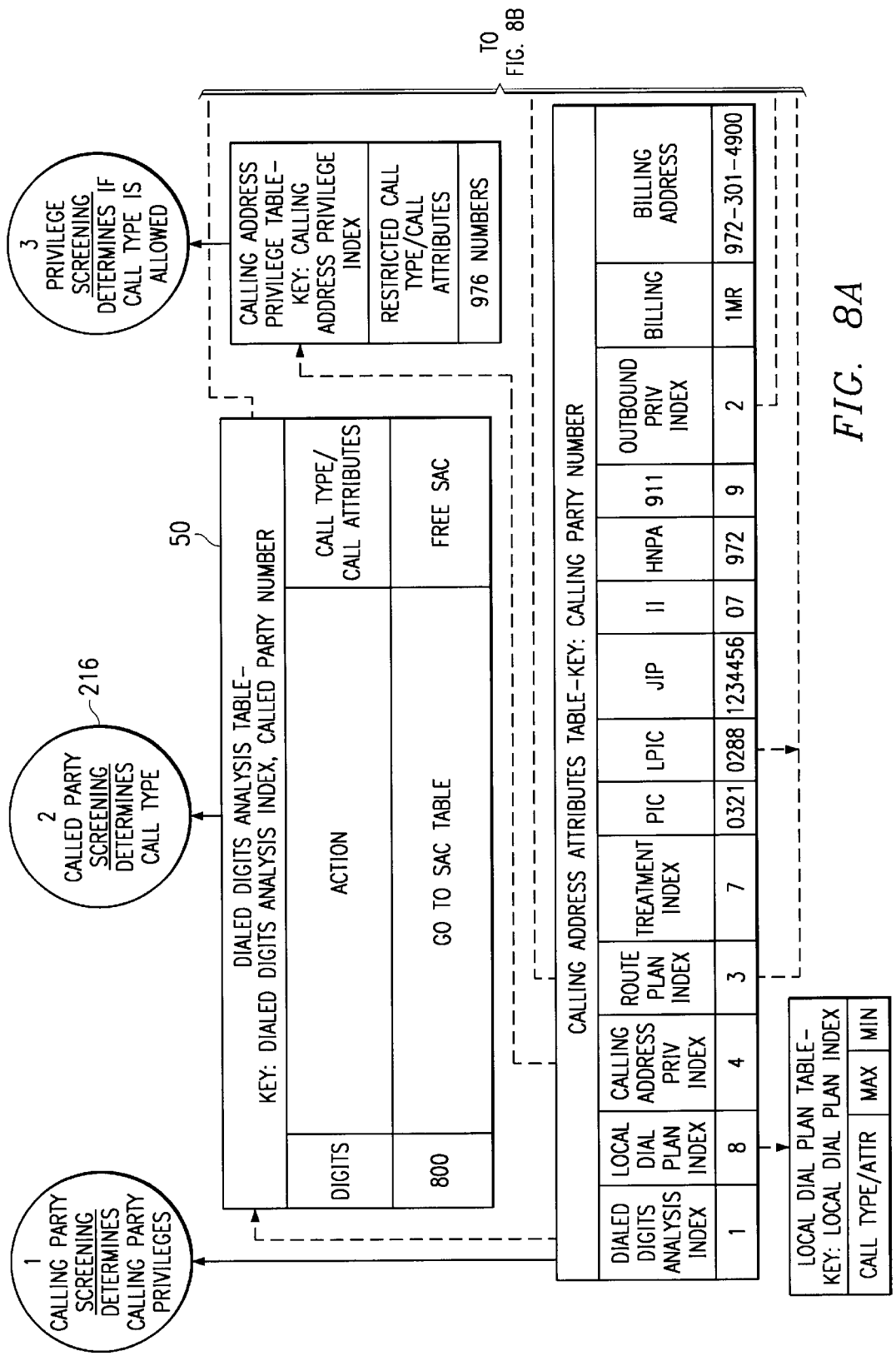
FIGS. 8A and 8B are schematic drawings showing tables and steps associated with the call control engine of FIG. 2A processing free service access code service requests originating from the Internet Protocol network for termination in the public switched telephone network of FIG. 1.
Figure 8B:
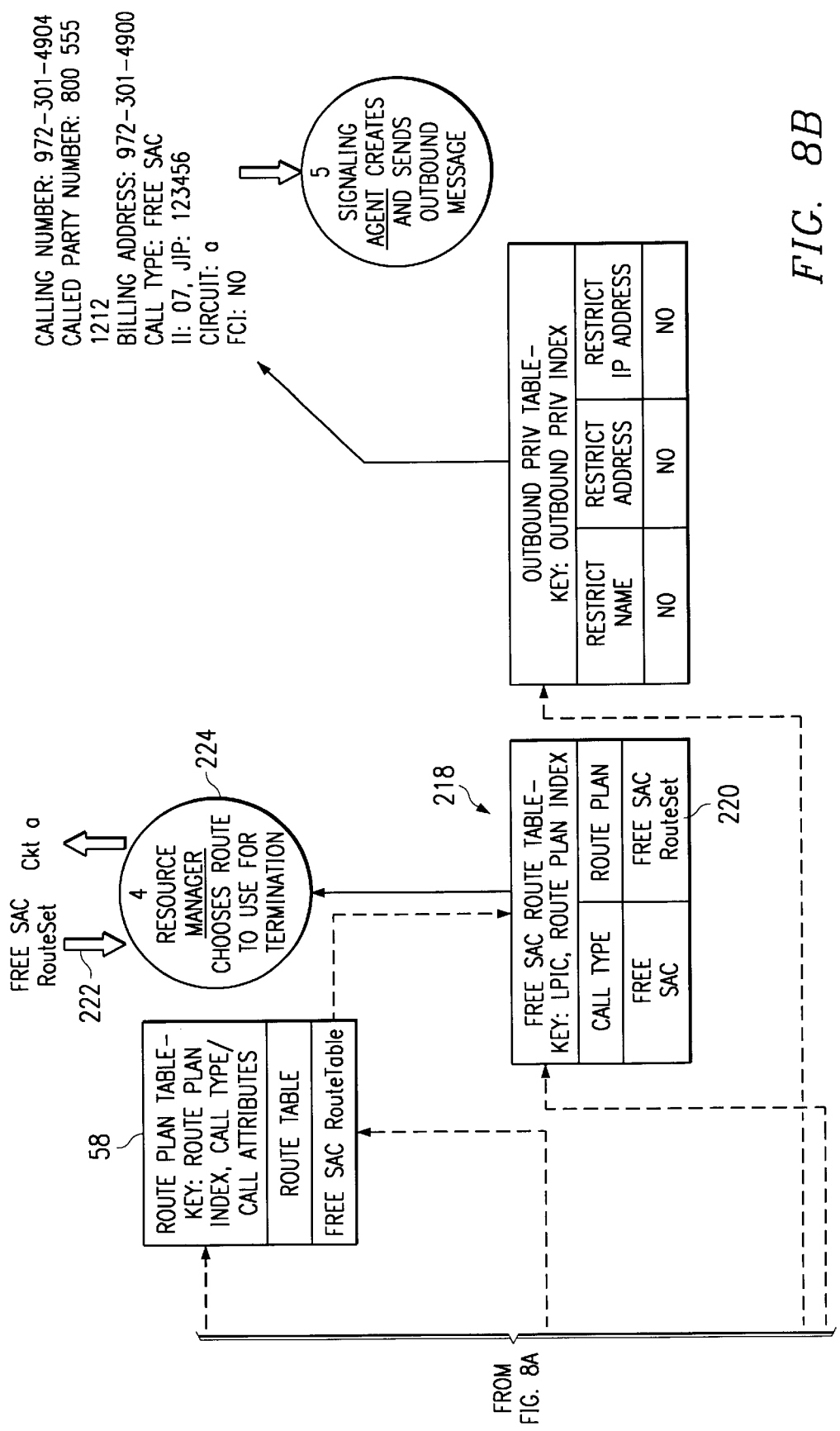

FIGS. 8A and 8B show call processing for a free service access code, in this example "800-555-1212." Based on the dialed digits "800", call control engine 34 determines from dialed digits analysis table 50 that the call type is a free service access code call at step 216. Based on this call type 88, call control engine 34 selects from call plan table 58 a route list table 218, which in this case has a title of "Free SAC Route Table." Route list table specifies route set 220 to provide to resource manager 28 as described in above, and indicated by reference numeral 222. Resource manager 28 then selects an appropriate circuit, as described previously.

Figure 9A:
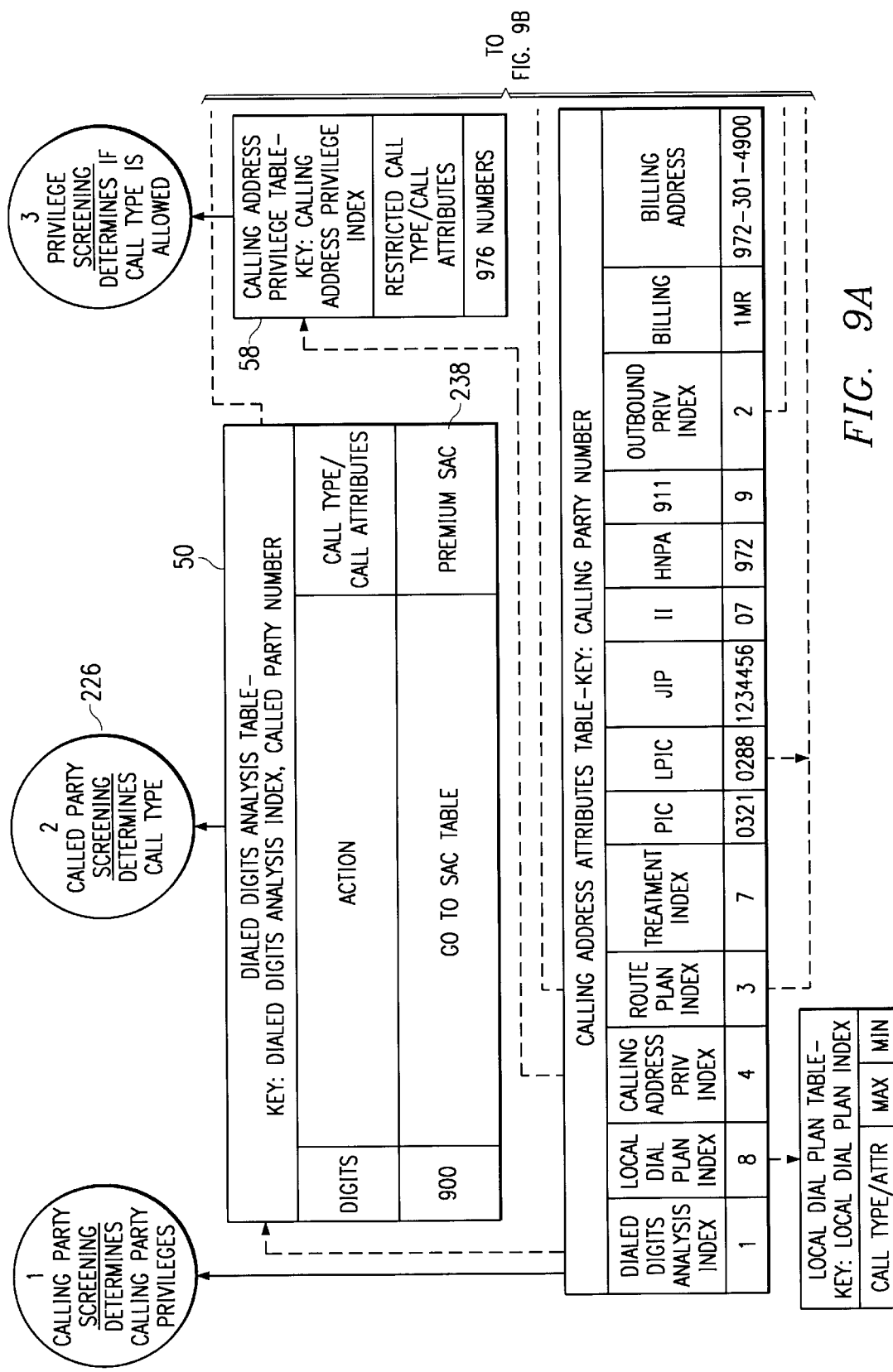
FIGS. 9A and 9B are schematic drawings showing tables and steps associated with call central engine of FIG. 2A processing a premium services access code service request originating from the Internet Protocol network for termination in the public switched telephone network of FIG. 1.
Figure 9B:
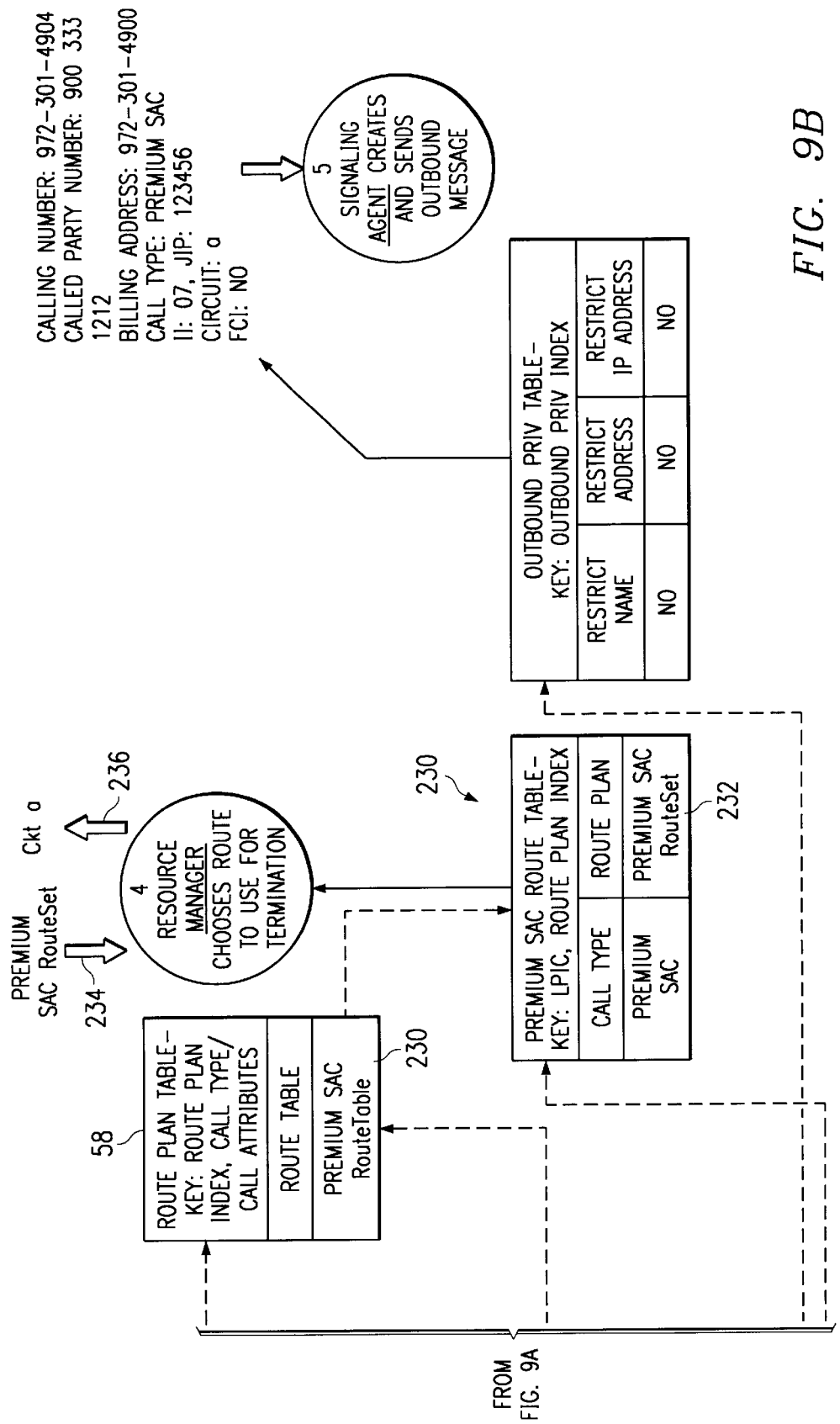

FIGS. 9A and 9B illustrate an example of call process for a premium service access code call such as "900-333-1212." Based on the called digits "900," call control engine 34 then determines from dialed digits analysis 50 at step 226 that the call type 88 is a premium service access code call, as illustrated by reference numeral 228. Call control engine 34 uses this call type 88 to identify within route plan table 58 a route list table 230, which in this case has a title "Premium SAC Route Table." Route list table 230 specifies a route set 232 having a title in this case of "premium SAC route set." Route set 232 is provided is resource manager 28 as denoted by reference numeral 234. Resource manager 28 determines the appropriate circuit for completing the call, as denoted by reference numeral 236, and processing proceeds as described above.

Figure 10A:
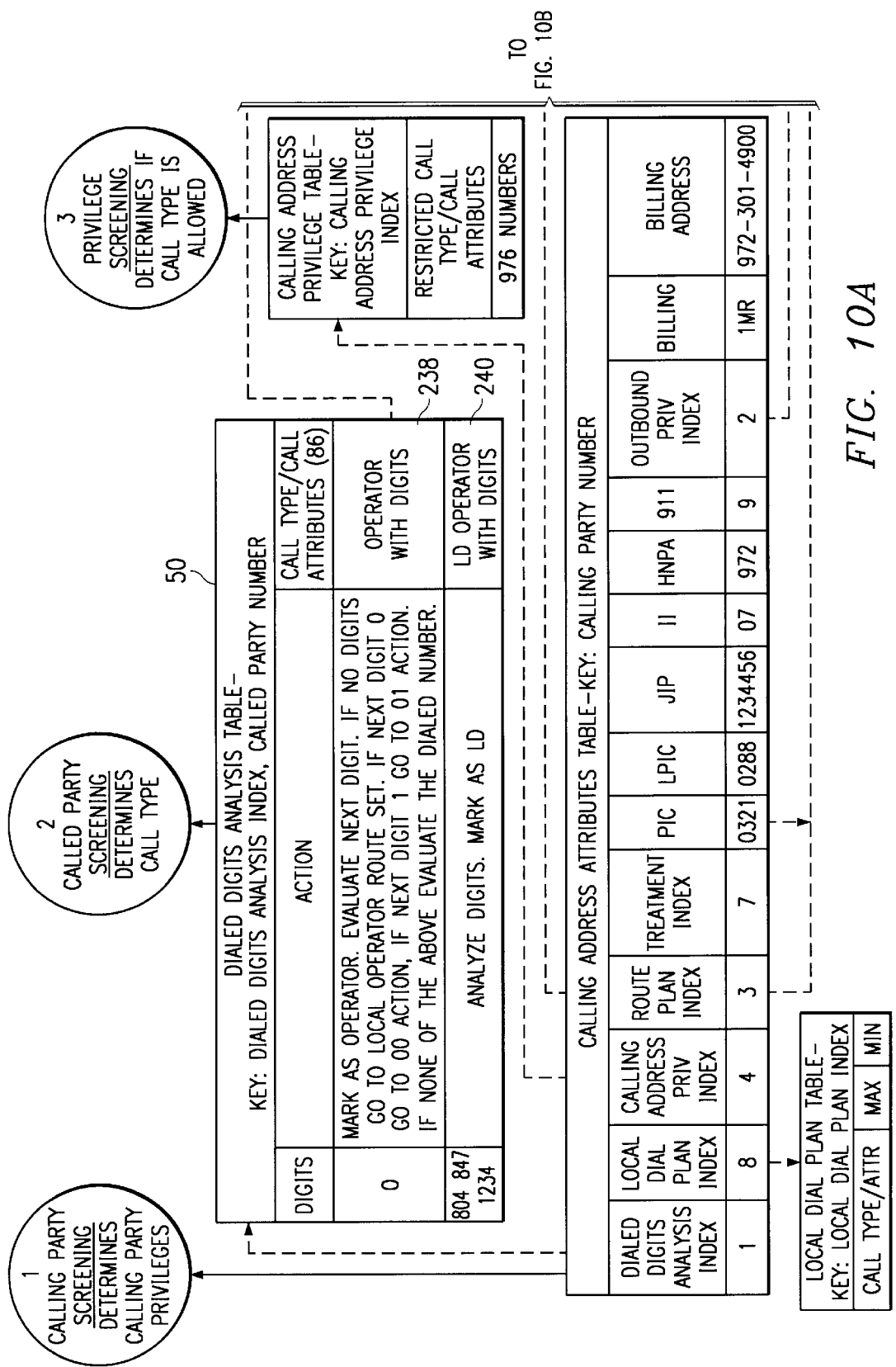
FIGS. 10A and 10B are schematic drawings showing tables and steps associated with the call control engine of FIG. 2A processing an operator with digits dialed service request originating from the Internet Protocol network for termination in the public switched telephone network of FIG. 1.
Figure 10B:
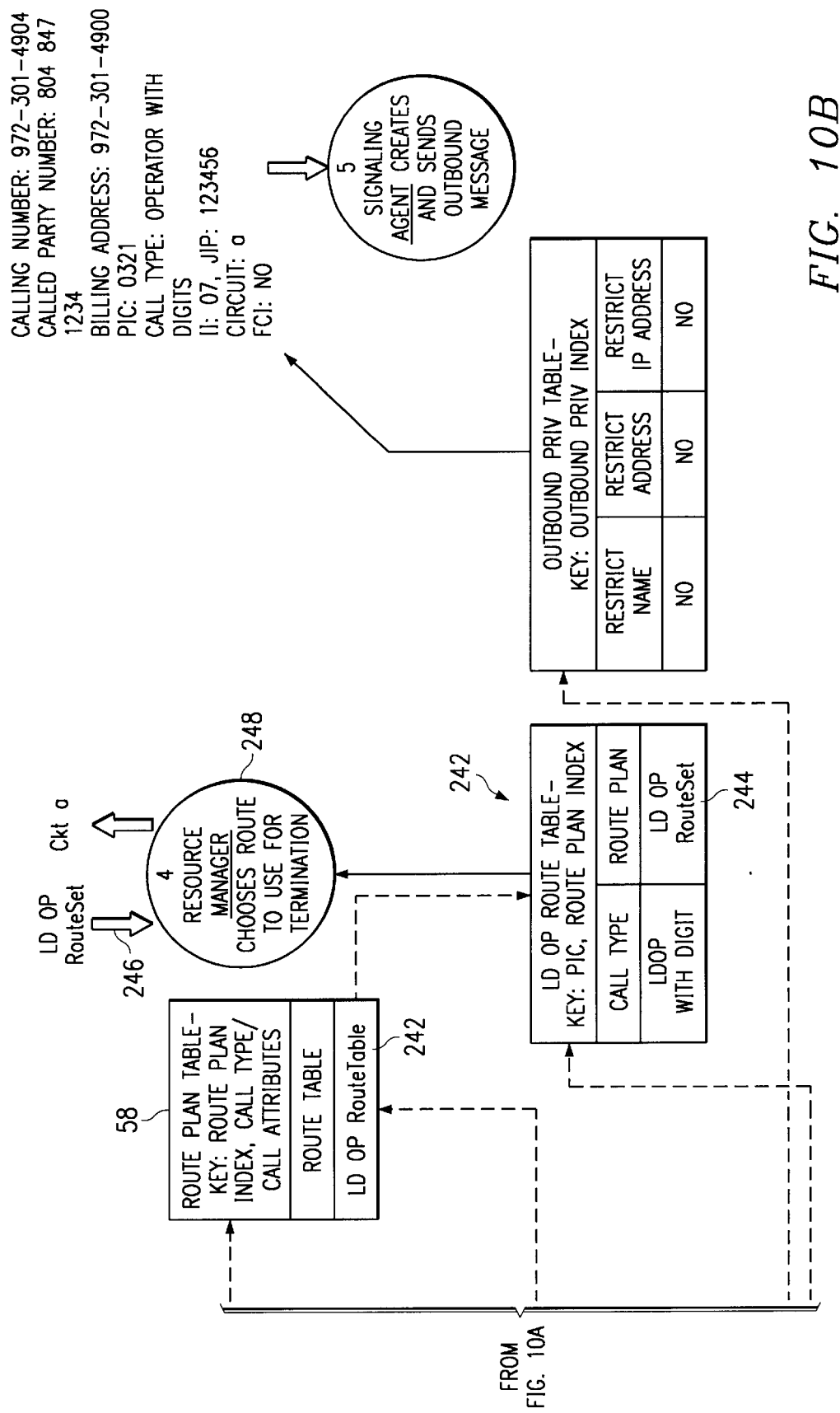

FIGS. 10A and 10B show call processing for an operator with digits call, for example, "08048471234." Based upon the dialed digits "0" call control engine 34 determines from dialed digits analysis table 50 that the call type 88 is an operator with digits call, as denoted by reference numeral 238. Based on the digits "8048471234" call type and attributes 88 is determined to additionally include the fact that the call is a long distance operator with digits. This is indicated by reference numeral 240. Call control engine 34 utilizes this call type and attributes 88 in conjunction with route plan table 58 to select a suitable route list table 242. In this case, route list table 242 has a title of "LD OP Route Table." Route table 242 specifies a route set 244, which is provided to resource manager 28, as indicated by reference 246. Resource manager 18 selects an appropriate circuit at step 248 in a similar manner to that described above.

Figure 11A:
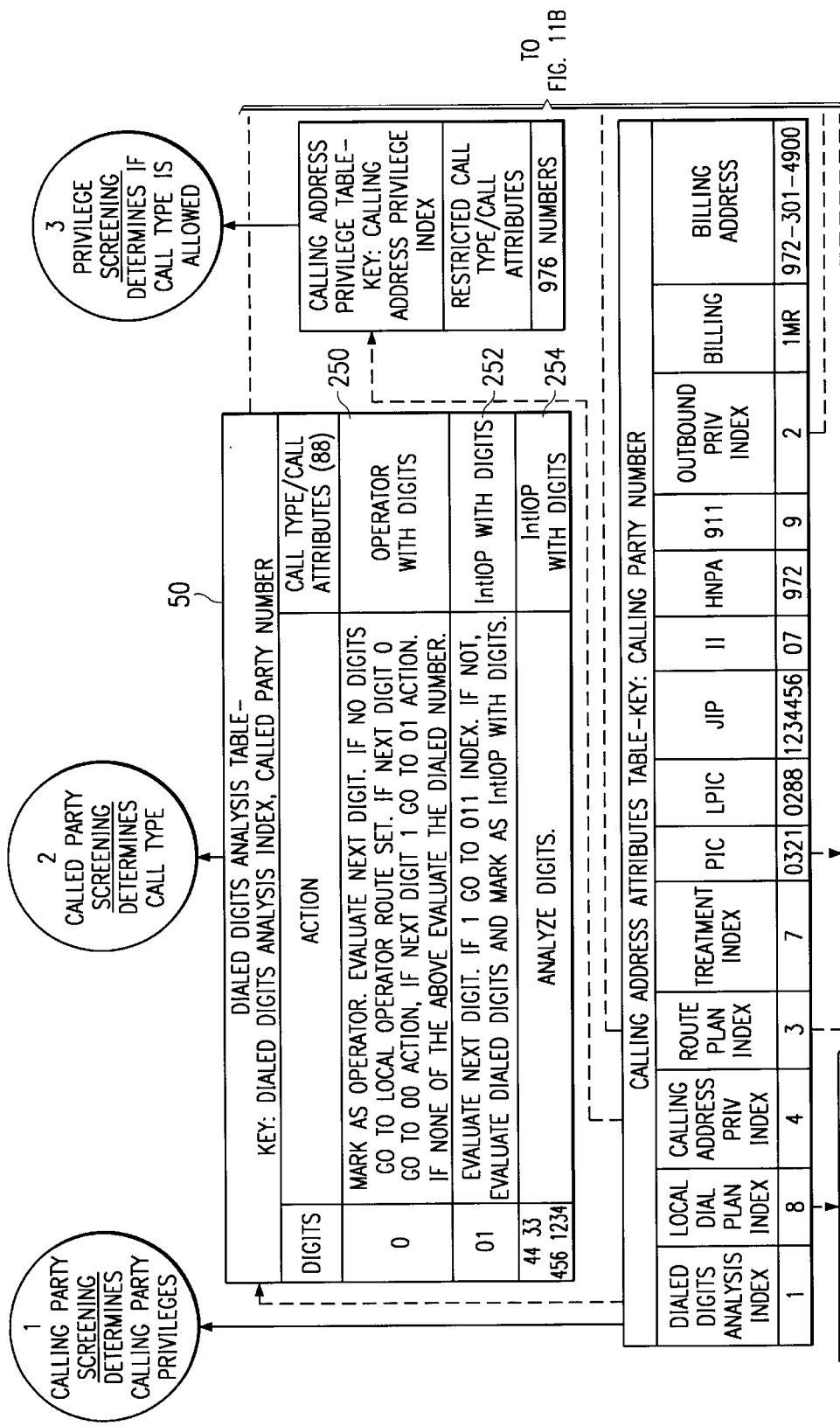
FIGS. 11A and 11B are schematic drawings showing tables and steps associated with the call control engine of FIG. 2A processing an international operator with digits dialed service request originating from the Internet Protocol network for termination in the public switched telephone network of FIG. 1.
Figure 11B:
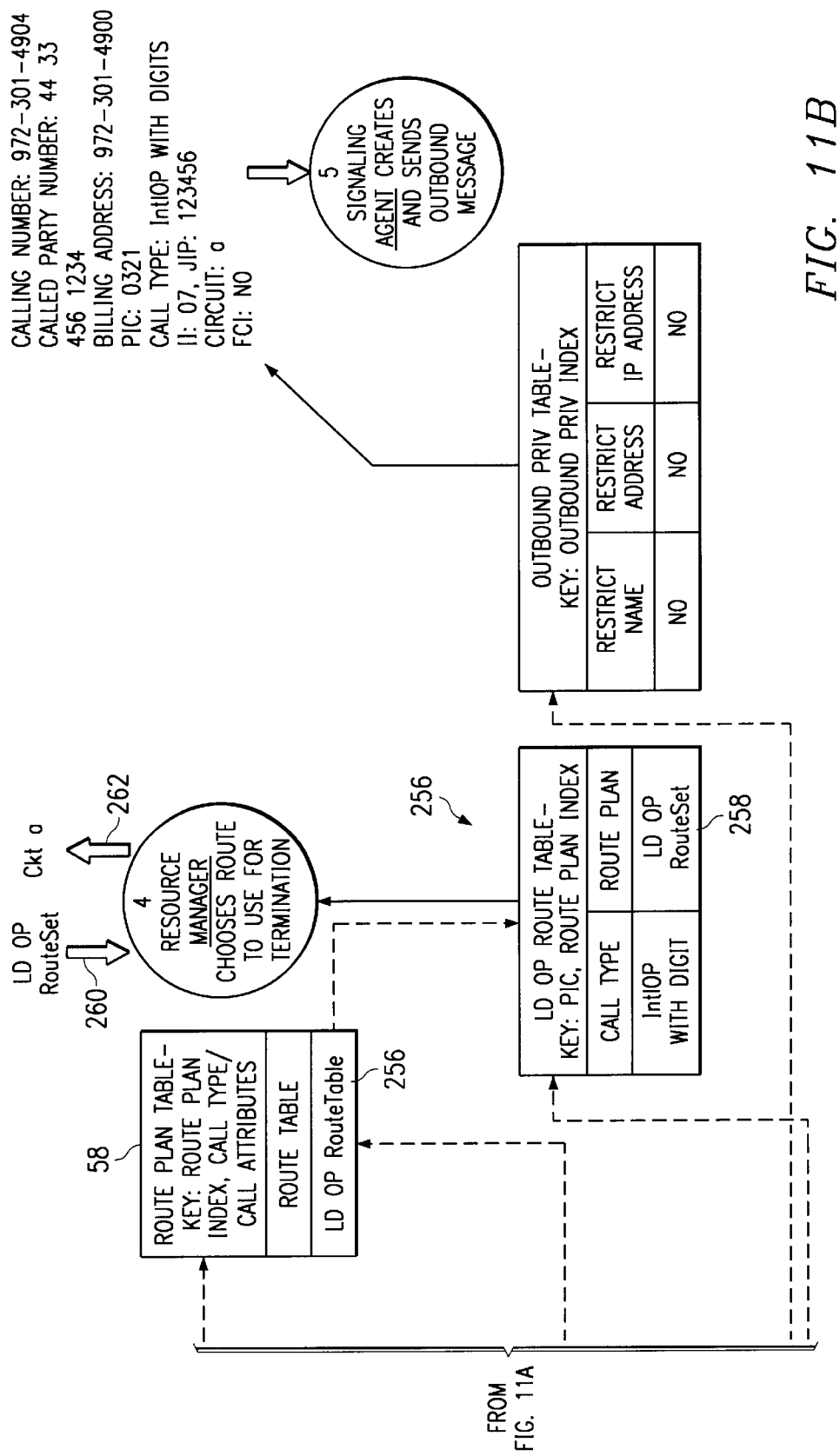

FIGS. 11A and B show call processing for an international operator with digits call, such as for example, "0144334561234." Based on the dialed digit "0" call control engine 34 determines that the call type 88 is an operator with digits call. This is indicated by reference numeral 250. Based on the next two digits "01" call control engine 34 determines that the call type 88 is additionally an international operator call with digits. This is indicated by reference numeral 252. The next eleven digits "44334561234" are used when the call is routed to the operator, as designated by reference numeral 244. Based upon these call type and attributes 88, call control engine 34 determines from route plan table 58 an appropriate list table 256, which in tern specifies an appropriate route set 258. Route set 258 is provided to resource manager 28 as indicated by reference numeral 260, and resource manager 28 selects and appropriate circuit, as noted by reference numeral 262. Call processing from this points continues as described above.

Figure 12A:
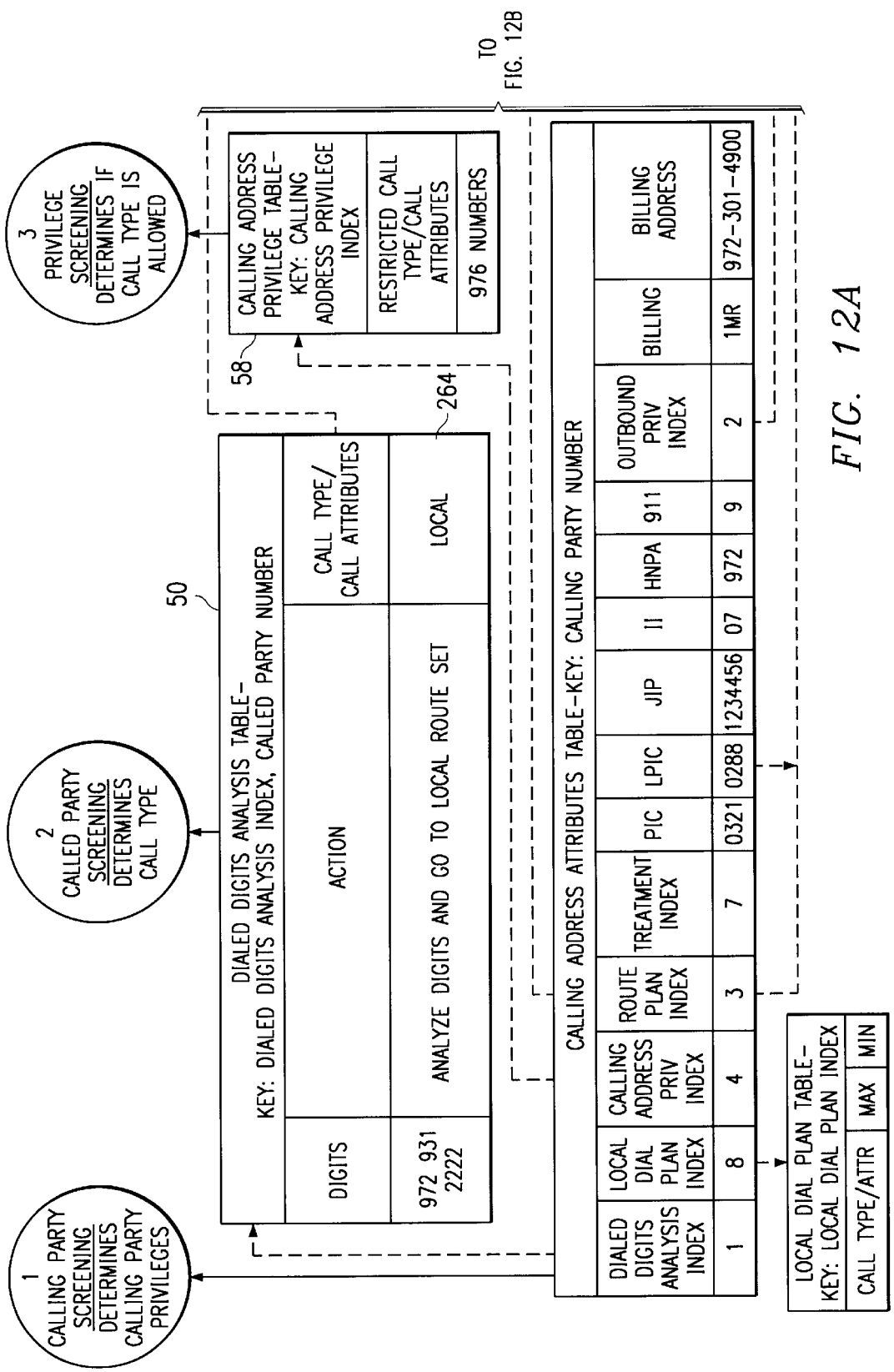
FIGS. 12A and 12B are schematic drawings showing tables and steps associated with the call control engine of FIG. 2A processing local call service request originating from the Internet Protocol network for termination in the public switched telephone network of FIG. 1.
Figure 12B:
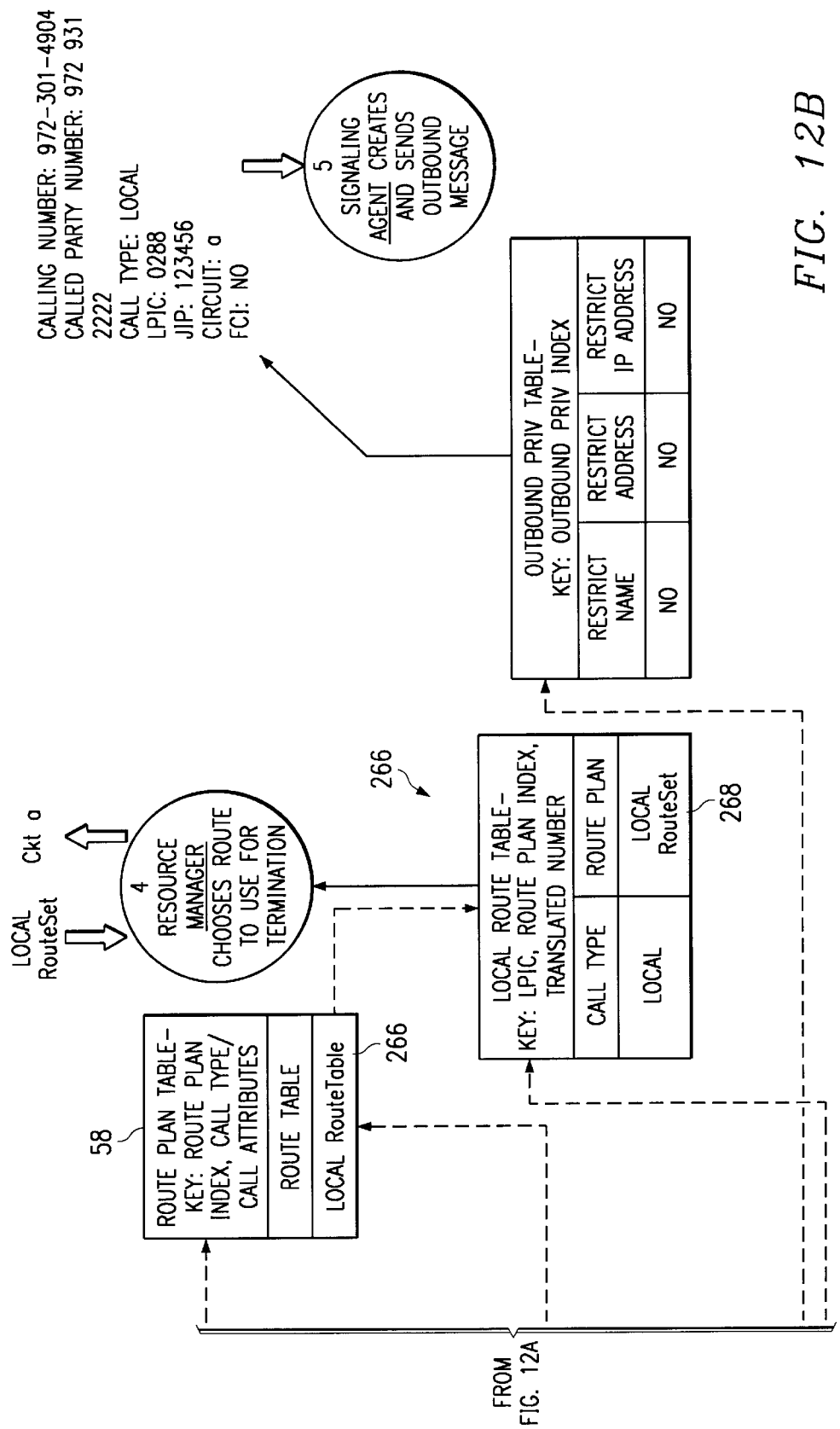

FIGS. 12A and 12B illustrate call processing for a local call based on the dialed digits "9729312222." Call control engine 34 determines from dialed digits analysis table 50 that the call type 88 is a local call as denoted by reference numeral 264. Based on this call type 88, call control engine 34 selects from route plan table 58 an appropriate route list table 266, which in this case has a title of "Local Route Table." Call control engine 34 selects from route list table 266 a route set 268. Route set 268 is utilized by resource manager 28 to select an appropriate circuit, as described above.

Figure 13A:
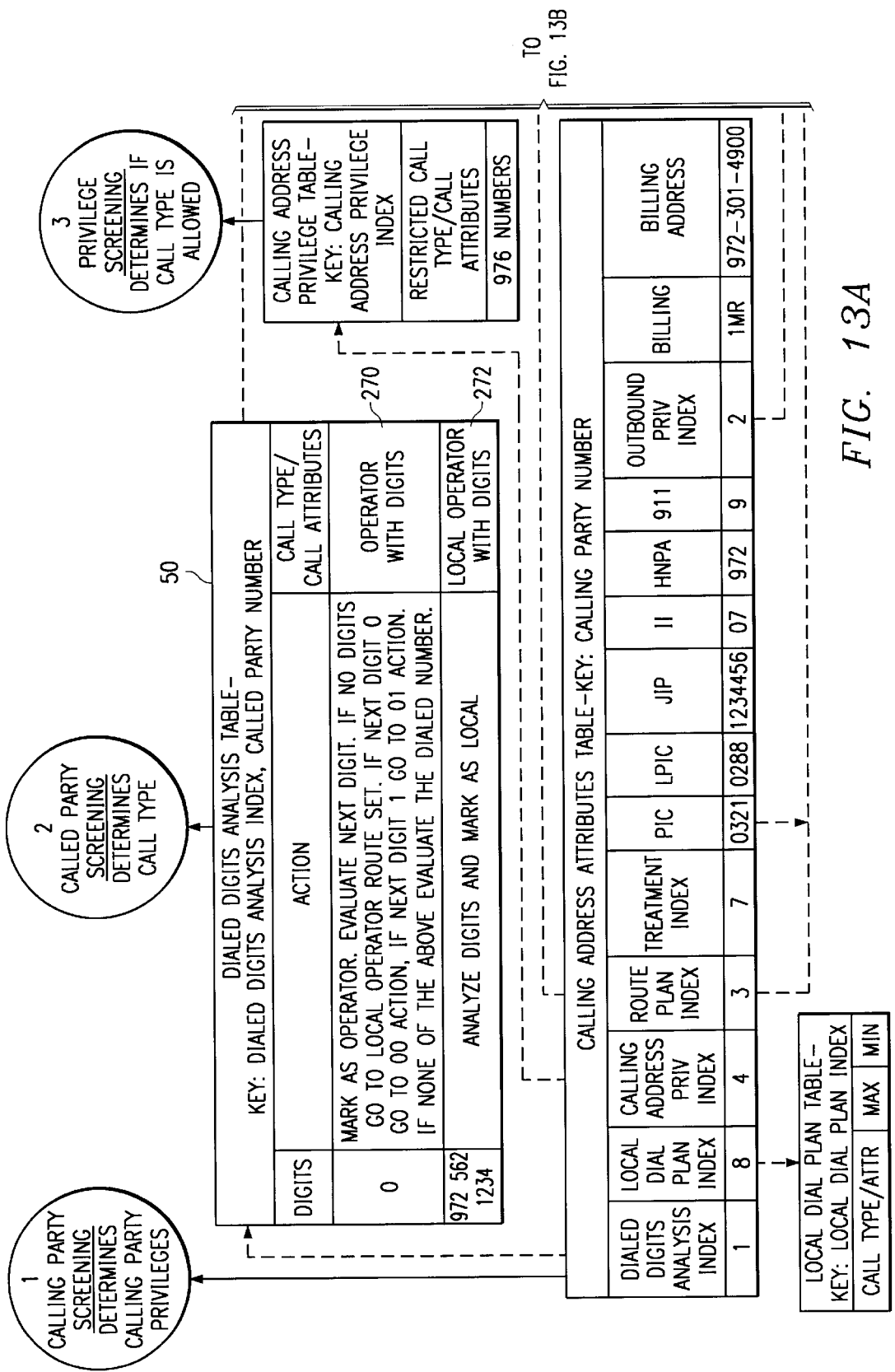
FIGS. 13A and 13B are schematic drawings showing tables and steps associated with the call control engine of FIG. 2A processing a local operator with digits service request originating from the Internet Protocol network for termination in the public switched telephone network of FIG. 1.
Figure 13B:
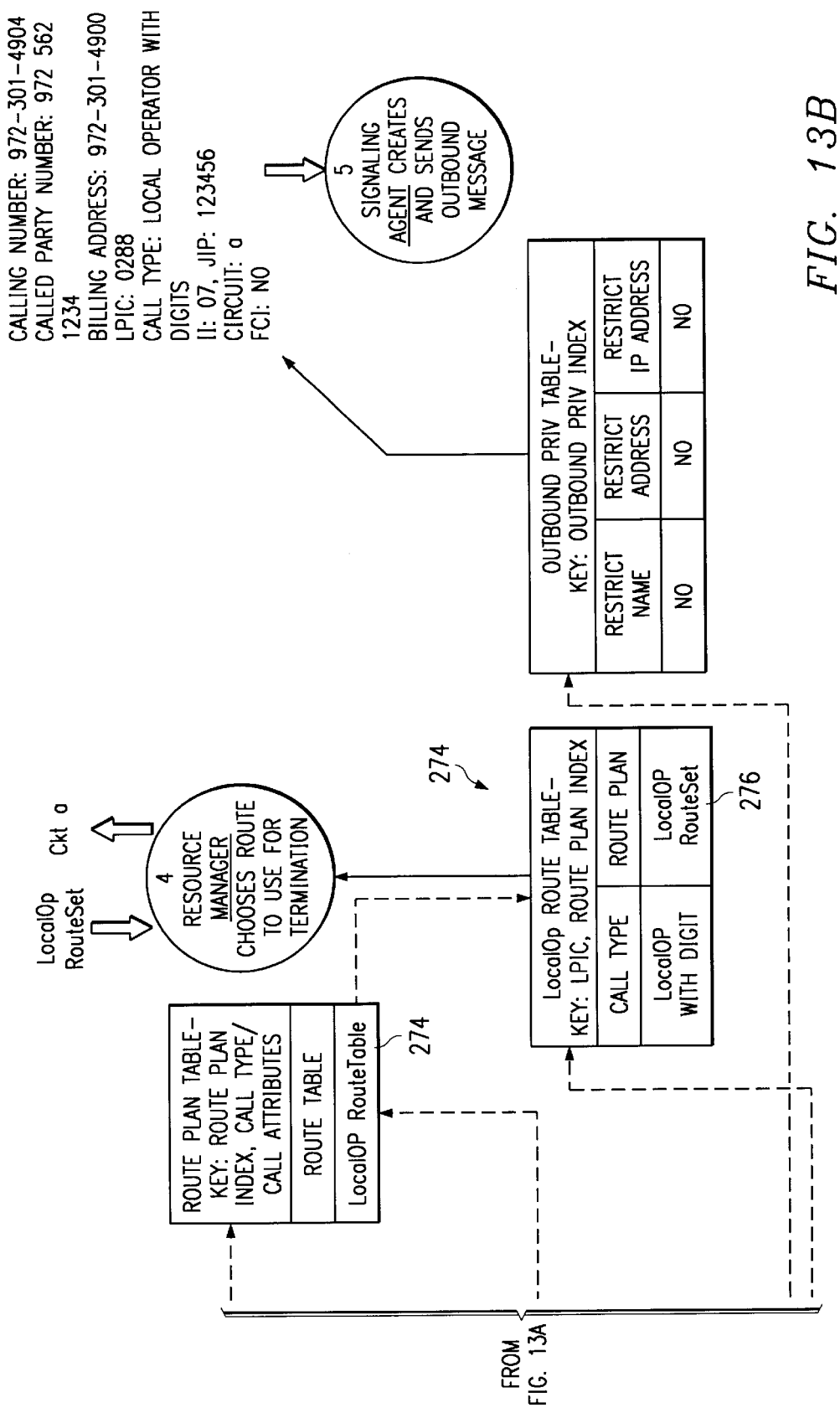

FIGS. 13A and 13B illustrate call processing for a local operator with digit call, such as for example, "09725621234." Based on the dialed digit "0" call control engine 34 determines from dialed digits analysis table 50 that the call type is an operator with digits call, as denoted by reference numeral 270. Call control engine 34 further specifies that the call type and attributes 88 is a local operator with digits telephone call, as denoted by reference numeral 272, so the call is routed to a local operator. Based on the call type and attribute 88, as well as route plan index 116, call control engine 34 selects an appropriate route list table 274, which in this case is "LocalOP Route Table." Route list table 274 specifies a route set 276, which in this case has a title of "LocalOP Route Set." Call processing continues as described above.

Figure 14A:
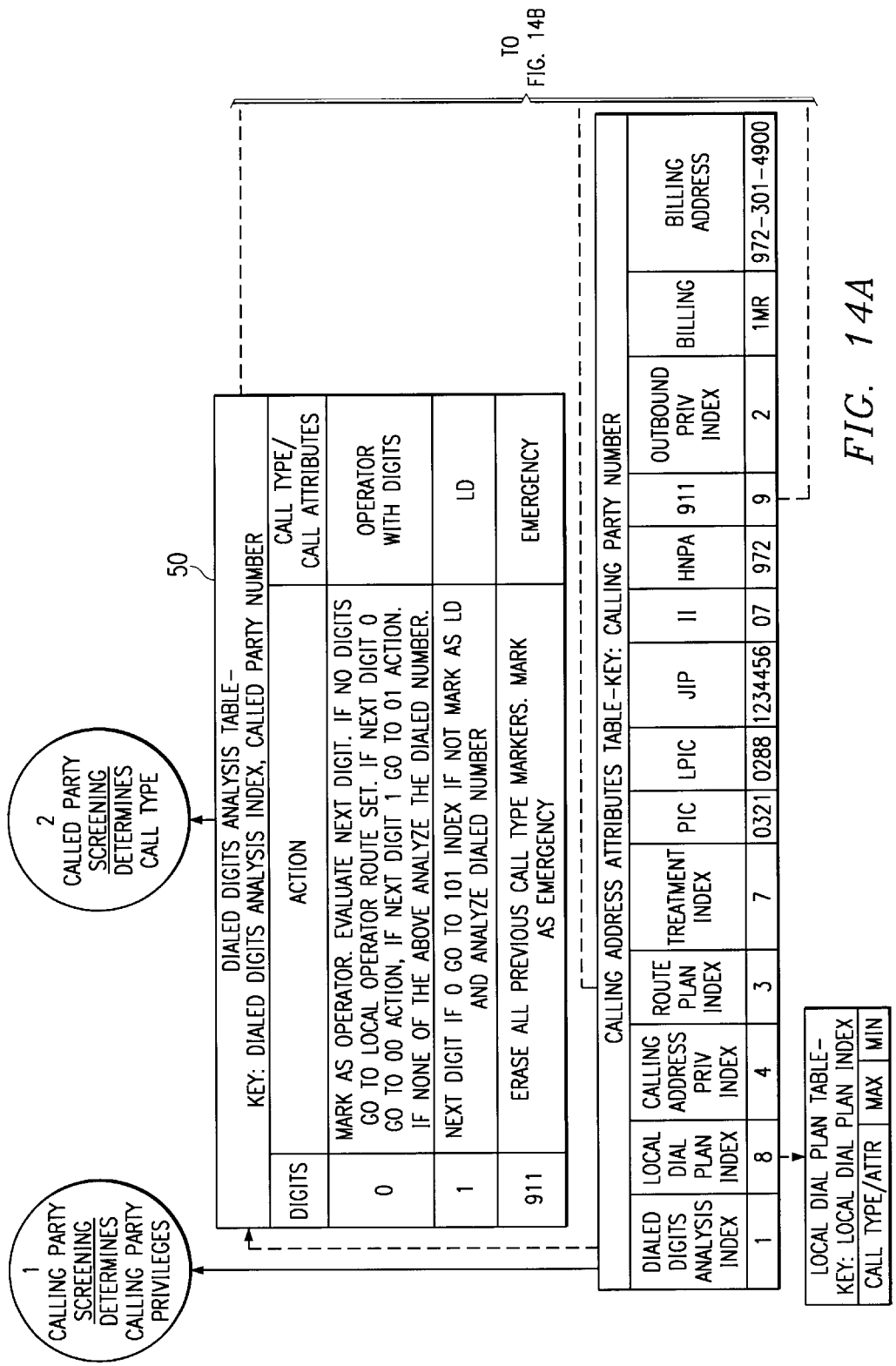
FIGS. 14A and 14B are schematic drawings showing tables and steps associated with the call control engine of FIG. 2A processing an emergency service request originating from the Internet Protocol network for termination in the public switched telephone network of FIG. 1.
Figure 14B:
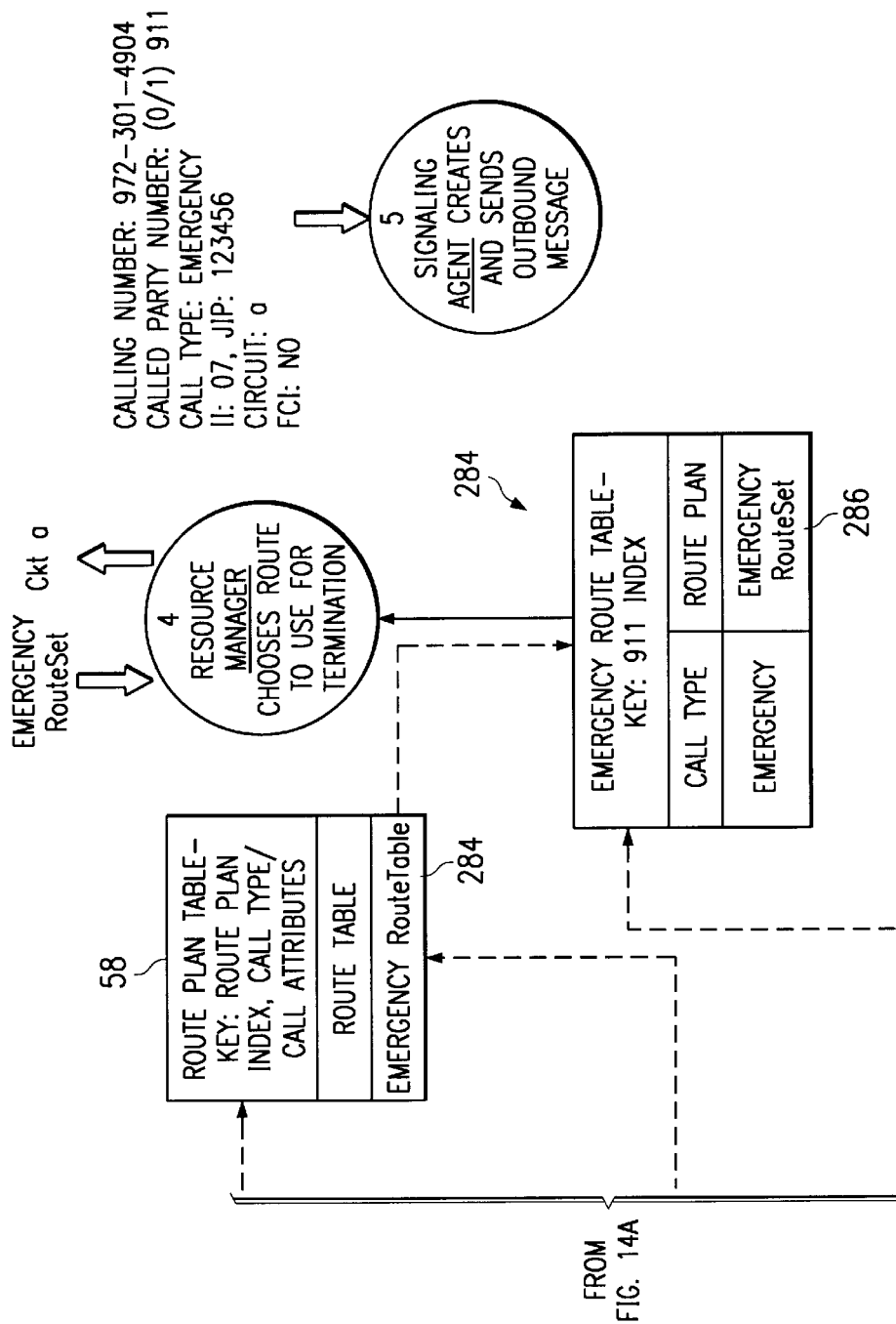

FIGS. 14A and B illustrate call processing for emergency calls, such as for example, "0911, "1911," and "911." Based on the dialed digit "0" the call type is determined to be an operator with digits call, as denoted by reference numeral 278. However, if the call initiated with a "1" digit, call control engine 34 will identify from dialed digits analysis table 50 that the call type 88 is a long distance call as denoted by reference numeral 280. However, regardless of whether the first digit was "0" or "1" or "911" once the "911" digits are analyzed, call control engine 34 determines that the call is an emergency call as denoted by reference numeral 282. Based on call type 88 of an emergency, call control engine 34 determines from route plan table 58 that the appropriate route list table 284 has a title "emergency route table." From this route table 284, an emergency route set 286 is selected, and call processing continues as described above.

Figure 15:
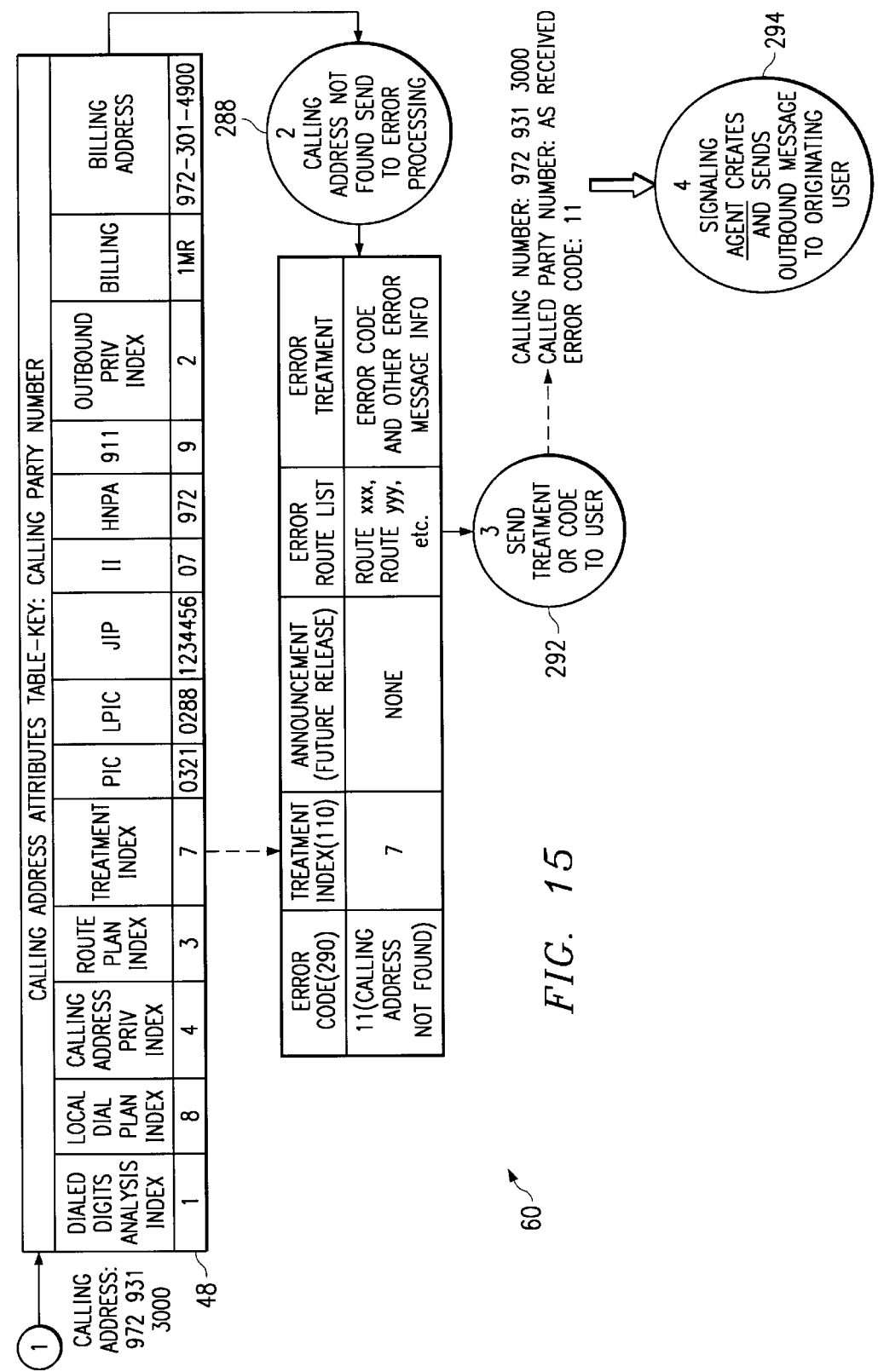
FIG. 15 is a schematic drawing showing tables and steps associated with the call control engine of FIG. 2A processing a calling address not found error.

FIG. 15 illustrates call processing for an error condition in which the calling address is not found. In this example, the calling address that is not found is "972-931-3000." At a step 288, call control engine 34 does not find the calling address attribute table 48; therefore error processing is invoked at step 288. According to this embodiment, call control engine 34 generates an error "11" indicating a calling address is not found. In addition, by default, treatment index "7" is specified for a default calling address. Based upon error code 290 and treatment index 118 an error route list is selected by call control engine 34 and the treatment of the call is sent back to the original user at step 294.

In the manner described in the examples of FIGS. 5A through 15, calls may be processed and routed that are originated in Internet Protocol network 14 and are destined for public switched telephone network 12. Processing of calls from public switched telephone network 12 to Internet Protocol 14 are performed in an analogous fashion, as described in conjunction with FIG. 4B. Thus, calls may be routed between networks having disparate signaling protocols through the use of table. In addition, calls may be routed within public switched telephone network 12 (PSTN to PSTN) and within Internet Protocol Network 14 (IP to IP) is an analogous manner. Furthermore services can be easily modified. Furthermore, the invention allows scalability and flexibility by allowing a subscriber to add tables as needed and add to the tables as needed. Therefore, very complex sets of services and privileges may be easily provisioned not only for a group of subscribers but also can be easily provisioned for a single subscriber. Moreover, billing records may be generated based on the examined digits and other obtained data, facilitating rapid billing.

Example tables used in database 40 are described below in conjunction with TABLES 1 through 11.

TABLE 1

Trunk Attributes Table:

| Trunk | Subscriber Translation Index | SIP Proxy Routing Index | Call Attribute/ Call Type | Treatment Index | CLLI |
|---|---|---|---|---|---|
| 2578 | 1 | | Inter-LATA Toll | 1 | |
| 6544 | 2 | 1 | | 2 | |

Key:
Trunk (1–4 digits).
Subscriber Translation Table Index is 1–3 digits.
Additional Call Attribute columns may be added as the need arises.
The CLLI is based on GR317, GR444.

Name is alphanumeric

SIP URL is based on IETF URL format, alphanumeric

IP Address is standard IP address format, digits, XXX.XXX.XXX.XXX

E-mail address is based on IETF URL format, alphanumeric

E.164 is digits, in domestic or international format, range 0 to 32 Attributes is alphanumeric.

TABLE 3

SIP Proxy Routing Table:

| SIP Proxy Routing Index | SIP Domain | SIP CMS Proxy |
|---|---|---|
| 1 | Tti.com | sgw1.tti.com |
| 1 | Att.com | sgw1.tti.com |
| 2 | mci.com | sgw2.tti.com |
| ... | ... | ... |
| ... | ... | ... |

Key:
SIP Proxy Routing Index (1–3 digits)
This table provides what proxy to use for which domains. i.e., if a tti.com appears in the "To:" address of the SIP then the call is sent to sgw1.tti.com.

TABLE 2

Subscriber Translation Table:
Please note that the numbers may be in domestic or international format and therefore consider both scenarios.

| Subscriber Index | E.164 | Name | SIP URL | Domain Name | IP Address | E-mail Address | Attributes |
|---|---|---|---|---|---|---|---|
| 1 | 1 972-301-4940 | Forest Gump | Forest.Gump@sgw1.tti.com | Sgw1.tti.com | 10.10.49.2 | Forest.Gump@ttimail.com | Provides ringback |
| 2 | 44 10 555 4444 | Sean Connery | | | | | |
| 3 | | Goldie Hawn | Goldie.hawn@sgw2.aol.com | Sgw2.aol.com | 100.100.100.2 | goldie@aol.com | |

Key: Subscriber Translation index (1–3 digits).

TABLE 4

| | | | | | | | | Calling Address Attributes: | | | | | | | |
|---|---|---|---|---|---|---|---|---|---|---|---|---|---|---|---|
| Calling Address | Dialed Digits Analysis Index | Local Dial Plan Index | Calling Address Privilege Index | Route Plan Index | Treatment Index | PIC | LPIC | Jurisdiction Information | II Digit | HNPA | 911 | Outbound Privacy Index | Billing | Billing Address |
| 1 972 301-4940 | 8 | 7 | 4 | 8 | 1 | 0321 | 0288 | 972907 | 00 | 972 | 9 | 2 | 1MR | 972-301-4900 |
| 1 972-678-8080 | 3 | 12 | 2 | 3 | 2 | 0321 | 0288 | 972301 | 63 | 910 | 9 | 1 | 1FR | |
| Bugs.Bunny@ ttimail.com | 3 | 1 | 4 | 3 | 3 | 0321 | 0288 | 214555 | 07 | 972 | 9 | 2 | 1DS | |

Key: Calling Address.
Call Address may be alphanumeric, may be in URL or e-mail format, or may be digits in E.164 or NPA-NXX-XXXX format.
Dialed Digit Analysis Index 1–3 digits—Pointer to the Dialed Digit Analysis Table. I.e., Dialed Digit Analysis is based on the calling party's subscriber profile.
Local Dial Plan Index is 1–3 digits—Pointer to the Local Dial Plan Table, which identifies that based on the calling party, what does what does the user's local dial plan look like, i.e., for each particular call type what is the format of the number, max and min number of digits.
Calling Address Privilege Index 1–3 digits—Pointer to the Calling Address Privilege Table, which identifies what are the call type restrictions for a particular Calling Party.
Route Plan index is a digit 1–3 digits—The Route Plan Index, which is based on the Calling Party, along with other Keys is provided to the Route Table identified by the Route Plan Table, to specify which route set to use based on the calling party's profile (i.e., Route Plan index) and other factors as the case may be, such as Call Type, LPIC, PIC, etc.
Treatment Index—1–3 digits—Pointer to the Error Table, used to decide on what type of treatment to use based on a particular error condition and the calling address.
PIC is 1–5 digits—This is the Calling User's Long distance Carrier ID code.
LPIC is 1–5 digits—This is the Calling user's Local Service Provider's Carrier ID Code.
Jurisdiction information is 6 digits—The JIP identifies the switch from which the call originates, and can be recorded to identify that switch.
II digits is 2 digits—The II digits get populated in the OLI parameter of the IAM.
HNPA is 3 digits—HNPA is the Home NPA, which defines the NPA for the calling party, if there is a call dialed without an NPA it is assumed that it is in the same NPA and therefore the CC will use the HNPA to populate NPA in front of NXX-XXXX.
911 index is 1 digit—Pointer to the 911 route table to identify what 911 route set to use for the Calling User.
Outbound privacy index is 1 digit—Pointer to the Outboard Privacy Table, which defines if the Calling User is pre-subscriber to Caller Name and/or number privacy.
Billing is 3 digits—To be used at a later date identifies that billing rate to use for the Calling User.
Billing Address—may be alphanumeric, may be in URL or e-mail format, or may be digits in E.164 or NPA-NXX-XXXX format. If digits, the limit is 0–32 digits. On the other hand, if the Calling Address is alphanumeric, there is not limit but must conform to the standard URL format. This is the address that the call is billed to, e.g., the PBX number. The PIC, LPIC, Jurisdiction Information, II Digit, HNPA, Billing, Billing Index are not indexes, they are actual values.

TABLE 5

Dialed Digit Analysis Table:

The called number may go through this table several times to:
  Identify Call Type
  Identify Call Attribute (CLIP, CLIR, etc.)
  Delete/Add digits
  Point back into the table for further analysis OR point to a different table for analysis
  End digit analysis
    This table does not provide some examples of Call Types and Call Attributes and actions.

Dialed
Digit

| Analysis Index | Digits | Action | Call Type/Call Attribute |
|---|---|---|---|
| 1 | 0+ | Next digit if 0 go to 3 if 1 go to 4 if non of the above mark as operator and analyze the NPA-NXX | OSPS |
| 1 | 0− | Mark as operator and Go to LD Opr Route Select | Local Operator W/out Digits |
| 2 | 00 | Mark as LD operator and Go to LD Opr Route Select | LD Operator W/out Digits |
| 2 | 01+ | Next digit if 1 go to 5 if not mark as LD operator and analyze the NPA-NXX | LD Operator International |
| 3 | 011 | Mark as International, analyze the Next Digits go to LD InterLATA Route select | International |
| 4 | 1+ | Next digit if 0 go to 7 if not mark as LD and analyze the NPA-NXX | LD |
| 5 | 101+ | Mark as CAC call and analyze service number | CAC |
| 6 | *XX | Analyze XX. Go to Star Service Table for specific processing instructions for that XX. | Star Service |
| 7 | N11 | Go to Table N11 | Information |
| 8 | 900 | Go to Table 900 | Premium SAC |
| 8 | 8XX | Go to Table SAC | Toll Free |
| 9 | 976 | Go to Table 976 | 976 Calls |
| 10 | NPA-NXX-XXXX | Analyze digits go to route select | Local, LD Intra LATA, LD Inter LATA |
| 11 | NXX-XXX | Analyze digits go to route select | Local |
| 12 | NP | Analyze digits go to route select | E.164 International |

Key: Dialed Digits Analysis Index and Dialed Digits.
Star Service Table describes what each * service logic should be, please note at end of this table the logic is going to refer the number back to Digit Analysis table to analyze the digits received after *XX code.
N11 Table describes logic for N11 calls
900 Table described logic for 900 calls
SAC table described logic for toll free calls
976 Table described logic for 976 calls Digits is 0 to 32 digits Action is what needs to happen next.

Call Type/Call Attribute is alphanumeric and it assigns a Call Type or a Call Attribute to the call.

TABLE 6

Local Dial Plan Table: This table provides some examples of Call Types and Call Attributes.

| Call Type/Call Attribute | Maximum | Minimum |
|---|---|---|
| Local | 11 | 1 |
| Operator | 1 | 1 |

Key:
Local Dial Plan Index (1–3 digits).
Call Type/Call Attribute is alphanumeric
Maximum is 1–2 digits
Minimum is 1–2 digits

TABLE 7

Calling Address Privilege Table:
(The number of columns is dependent on the plan defined for each index)

| Calling Address Privilege Index | Restricted Calling Area | Restricted Calling Area | Restricted Calling Area |
|---|---|---|---|
| 1 | 976 Numbers | International | |
| 2 | Operator | 900 Numbers | Information |
| 3 | *XX | CAC calls | International |
| 4 | CAC calls | Toll Free | |
| 5 | International | Operator | |

Key:
Calling Address Privilege Index (1–3 digits)
Restricted Calling Area is alphanumeric. It lists the call types being restricted.

TABLE 8

Outbound Privacy Table:

| Outbound Privacy Index | Restrict Name | Restrict Address | Restrict IP Address |
|---|---|---|---|
| 1 | Y | Y | Y |
| 2 | Y | | |
| 3 | | Y | Y |

Key:
Outbound Privacy Index (1–3 digits)
Restrict Name is Boolean
Restrict Address is Boolean
Restrict IP Address is Boolean

TABLE 9

Route Plan Table:
(This table contains example options.)

| Route Plan Index | Call Type/Call Attribute | Route Table |
|---|---|---|
| 1 | International, LD InterLATA, . . . | LD InterLATA Route Table |
| 2 | LD IntraLATA | IntraLATA Route Table |
| 1 | International Operator LD Operator . . . | International Op Route |
| 3 | FreeSAC | FreeSAC Route |
| 3 | PremSAC | Premium SAC Route |
| 4 | Local, . . . | Local Route |
| 4 | Local Operator, . . . | Local OP Route |
| 1 | Emergency | Emergency Route |

Key:
Route Plan Index, Call Type/Call Attribute (alphanumeric).
Please note that not all Call Types/Call Attributes and route table options are listed.
Based on the Route Plan Index, which is indexed off of the Calling Party Number, the call type, and call attribute, it is determined which Route Set Table to access.

TABLE 10

LD InterLATA TABLE:

| PIC | Route Plan Index | Route Option 1 | Route Option 2 | Route Option 3 |
|---|---|---|---|---|
| 0321 | 1 | Route Set X | Route Set Y | Treatment Option |
| 0321 | 1 | . . . | . . . | . . . |
| 0321 | 1 | | | |

TABLE 10-continued

LD InterLATA TABLE:

| PIC | Route Plan Index | Route Option 1 | Route Option 2 | Route Option 3 |
|---|---|---|---|---|
| . | | | | |
| . | | | | |
| . | | | | |
| 0322 | 2 | | | |
| 0322 | 2 | | | |
| 0322 | 2 | | | |

Key:
PIC, Route Plan Index.
*For tables identifying routes for Local Calls instead of PIC use LPIC.
PIC and LPIC are 4 digits
Route Plan index is 1–3 digits Route Option provides the route set name. For each Route plan index and PIC/LPIC there could be many different route set options.
PLEASE NOTE: There will be up to 8 trunk groups and/or treatments supported with each route set.

TABLE 11

Error Table:

| Error Code | Treatment Index | Announcement (future release) | Route Advance | Release with Cause |
|---|---|---|---|---|
| 11 (Calling Address Not Found) | 1 | None | Route xxx, Route xxx, etc. | None |
| 14 | 1 | Announcement Server X, Announcement Code 1234 | None | None |

Key:
Error Index (1–3 digits), and error code (1–5 digits).
Please note that the error code may be the ISUP Release Cause Value, the SIP Error Code value or internal Error Code values.
Announcement will at least contain the name of the announcement server to use and the announcement code to be played.

Error Route List will contain a list of trunks from which the Resource Manager can choose to route the call.
Error Treatment will contain the information necessary to send to Termination SA so that Termination SA can compose and send error treatment back to the caller.

Although the present invention and its advantages have been described in detail, it should be understood that various changes, substitutions and alterations can be made therein without departing from the spirit and scope of the present invention as defined by the appended claims.

What is claimed is:

1. A method for routing a telephone call originating at a first network that utilizes a first signaling protocol to a termination in a second network that uses a second signaling protocol comprising:
   receiving a service request associated with a calling party from the first network;
   translating the service request;
   determining a route for processing the service request over the second network;
   generating signaling specifying the determined route; and
   wherein determining the route for processing the request over the second network comprises:
      determining an address for the calling party;
      accessing a table associated with the address, the table comprising a plurality of pointers to a plurality of additional tables;

accessing at least one of the additional tables specified by at least one of the pointers; and in response to accessing the at least one of the additional tables, determining the route for processing the request based on the at least one of the additional tables.

2. The method of claim 1, wherein assessing a table associated with the address comprises accessing a table having a pointer to a table associated with calling digits associated with the service request.

3. The method of claim 1, wherein assessing a table associated with the address comprises accessing a table having a pointer to a table associated with call privileges associated with the calling party.

4. The method of claim 1, wherein assessing a table associated with the address comprises accessing a table having a pointer to a table associated with call privileges associated with the calling party.

5. The method of claim 1, wherein assessing a table associated with the address comprises accessing a table having a pointer to a table associated with a route plan associated with the calling party.

6. The method of claim 1, wherein assessing a table associated with the address comprises accessing a table having a pointer to a table associated with a privacy setting associated with the calling party.

7. The method of claim 2, and further comprising accessing the table associated with called digits associated with the service request and determining from the table a call type for the service request.

8. The method of claim 7, and further comprising accessing a table associated with privileges for the calling party and determining from the table privileges for the calling party.

9. The method of claim 7, and further comprising accessing a table storing a plurality of possible routes for the service request, and selecting an appropriate route based on the call type.

10. The method of claim 2, and further comprising compiling a profile associated with the service request, the profile comprising a type of call associated with the service request and a route plan table storing a plurality of possible routes for the calling party.

11. The method of claim 1, wherein the first protocol is Signaling System 7 protocol.

12. The method of claim 11, wherein the second protocol is Internet Protocol.

13. The method of claim 7, and further comprising determining whether the type of call is permitted for the calling party.

14. The method of claim 7, and further comprising selecting the route based on the calling party and calling type.

15. The method of claim 1, and further comprising creating and transmitting a message to effect the call over the selected route.

16. The method of claim 1, and further comprising storing information from the service request for generation of a bill associated with the service request.

17. The method of claim 1, and further comprising storing information retrieved from the at least one table for generation of a bill associated with the service request.

18. The method of claim 1 and further comprising controlling media transport of content associated with the service request.

19. A method for routing a telephone call originating at a first network that utilizes a first signaling protocol to a termination in a second network that uses a second signaling protocol comprising:

receiving a service request from the first network, the service request destined for a called party within the second network;

translating the service request;

determining a route for processing the service request over the second network;

generating signaling specifying the determined route; and wherein determining the route for processing the request over the second network comprises:

determining an address for the called party;

accessing a table associated with the address, the table comprising a plurality of pointers to a plurality of additional tables;

accessing at least one of the additional tables specified by at least one of the pointers; and in response to accessing the at least one of the additional tables, determining the route for processing the request based on the at least one of the additional tables.

20. The method of claim 19, wherein assessing a table associated with the address comprises accessing a table having a pointer to a table associated with calling digits associated with the service request.

21. The method of claim 19, wherein assessing a table associated with the address comprises accessing a table having a pointer to a table associated with call privileges associated with the called party.

22. The method of claim 19, wherein assessing a table associated with the address comprises accessing a table having a pointer to a table associated with call privileges associated with the called party.

23. The method of claim 19, wherein assessing a table associated with the address comprises accessing a table having a pointer to a table associated with a route plan associated with the called party.

24. The method of claim 20, and further comprising accessing the table associated with the called digits and determining from the table a call type for the service request.

25. The method of claim 24, and further comprising accessing a table storing a plurality of possible routes for the service request, and selecting an appropriate route based on the call type.

26. The method of claim 20, and further comprising compiling a profile associated with the service request the profile comprising a type of call associated with the service request and a route plan table storing a plurality of possible routes for the called party.

27. The method of claim 19, wherein the first protocol is Signaling System 7 protocol.

28. The method of claim 19, wherein the second protocol is Internet Protocol.

29. The method of claim 19, and further comprising creating and transmitting a message to effect the call over the selected route.

30. The method of claim 19, and further comprising storing information from the service request for generation of a bill associated with the service request.

31. The method of claim 19, and further comprising storing information retrieved from the at least one table for generation.

32. The method of claim 19 and further comprising controlling media transport of content associated with the service request.

33. A system for routing a telephone call originating at a first network that utilizes a first signaling protocol to a termination in a second network that uses a second signaling protocol, the system comprising:

a signaling agent operable to:

receive and translate signaling according to the first protocol;

receive and translate signaling according to the second protocol; and generate signaling according to the first and according to the second protocol; and a call control and router engine operable to:
receive a translated signaling message from the signaling agent; and
determine a route for a service request associated with a translated signaling message received from the signaling agent by:
determining an address for a calling party associated with the service request:
accessing a table associated with the address, the table comprising a plurality of pointers to a plurality of additional tables;
accessing at least one of the additional tables specified by at least one of the pointers; and
in response to accessing the at least one of the additional tables, determining the route for processing the request based on the at least one of the additional tables.

34. A system interconnecting a plurality of networks including at least two networks that utilize different communications protocols, the system comprising:

a signaling agent coupled to the plurality of networks and operable to receive an incoming signaling message associated with a service request, translate the incoming signaling messages to a translated message, and translate outgoing signaling messages to a format understandable by at least one of the plurality of networks;

a call control engine operable to receive the translated message, generate an outgoing signaling message, and send the outgoing message to the signaling agent, the outgoing signaling message indicative of the route over which the service request will be filled;

wherein the translated message is a message understandable by the call control engine; and wherein the call control engine is operable to generate the outgoing signaling message indicative of the route over which the service request will be filled by:
determining an address for a calling party associated with the service request:
accessing a table associated with the address, the table comprising a plurality of pointers to a plurality of additional tables;
accessing at least one of the additional tables specified by at least one of the pointers; and
in response to accessing the at least one of the additional tables, determining the route for processing the request based on the at least one of the additional tables.

35. A method for routing a telephone call comprising:

receiving a service request associated with a party;

translating the service request;

determining a route for processing the service request; and generating signaling specifying the determined route; and wherein determining the route for processing the request comprises:
determining an address for the party;
accessing a table associated with the address, the table comprising a plurality of pointers to a plurality of additional tables;
accessing at least one of the additional tables specified by at least one of the pointers; and
in response to accessing the at least one of the additional tables, determining the route for processing the request based on the at least one of the additional tables.

36. The method of claim 35, wherein assessing a table associated with the address comprises accessing a table having a pointer to a table associated with calling digits associated with the service request.

37. The method of claim 35, wherein assessing a table associated with the address comprises accessing a table having a pointer to a table associated with call privileges associated with the party.

38. The method of claim 35, wherein assessing a table associated with the address comprises accessing a table having a pointer to a table associated with call privileges associated with the party.

39. The method of claim 35, wherein assessing a table associated with the address comprises accessing a table having a pointer to a table associated with a route plan associated with the party.

40. The method of claim 35, wherein assessing a table associated with the address comprises accessing a table having a pointer to a table associated with a privacy setting associated with the party.

41. The method of claim 36, and further comprising accessing the table associated with the called digits and determining from the table a call type for the service request.

* * * * *